United States Patent
Sawayama et al.

(10) Patent No.: US 7,188,961 B2
(45) Date of Patent: Mar. 13, 2007

(54) CORNER CUBE REFLECTOR, METHOD OF MAKING THE REFLECTOR AND REFLECTIVE DISPLAY DEVICE INCLUDING THE REFLECTOR

(75) Inventors: Yutaka Sawayama, Nabari (JP); Sayuri Fujiwara, Nara (JP); Makoto Kanbe, Sakurai (JP); Kiyoshi Minoura, Nara (JP); Ichiro Ihara, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 41 days.

(21) Appl. No.: 10/968,239

(22) Filed: Oct. 20, 2004

(65) Prior Publication Data

US 2005/0088743 A1  Apr. 28, 2005

(30) Foreign Application Priority Data

Oct. 27, 2003  (JP) ............................. 2003-366157

(51) Int. Cl.
G02B 5/124 (2006.01)
(52) U.S. Cl. ...................................... 359/530; 359/900
(58) Field of Classification Search ................ 359/529, 359/530, 729, 900; 349/113
See application file for complete search history.

(56) References Cited

U.S. PATENT DOCUMENTS 5,558,740 A * 9/1996 Bernard et al. ............. 359/530

6,540,367 B1    4/2003    Benson et al.
6,657,766 B2   12/2003    Minoura et al.
2004/0004765 A1  1/2004   Ihara et al.
2004/0085611 A1  5/2004   Minoura et al.

FOREIGN PATENT DOCUMENTS

| JP | 7-205322    | 8/1995  |
| JP | 11-64831    | 3/1999  |
| JP | 2002-287134 | 10/2002 |
| KR | 2001-018578 A | 3/2001 |

OTHER PUBLICATIONS

Neudeck et al, "Precision Crystal Corner Cube Arrays for Optical Gratings Formed by (100) Silicon Planes with Selective Epitaxial Growth," Applied Optics, vol. 35, No. 19, Jul. 1996, pp. 3466-3470.
Korean Office Action and English translation thereof mailed Jun. 30, 2006 in corresponding Korean application No. 10-2004-0086263.

* cited by examiner

*Primary Examiner*—Euncha P. Cherry
(74) *Attorney, Agent, or Firm*—Nixon & Vanderhye, P.C.

(57) ABSTRACT

A corner cube reflector includes a two-dimensional arrangement of unit elements. The unit elements are arranged at a pitch of 200 μm or less. As viewed in a direction from which incoming light is coming, each unit element has a peak point and a bottom point. A peak portion, including the peak point, has an excessive portion and/or a missing portion as compared with an ideal peak portion of an ideal corner cube. The level of the peak point is lower than that of the ideal peak point of the ideal corner cube. An average level difference $h_2$ between the level of the bottom point and that of an ideal bottom point of the ideal corner cube is smaller than an average level difference $h_1$ between the level of the peak point and that of the ideal peak point.

10 Claims, 11 Drawing Sheets

Master

1st Transfer   (Master)

2nd Transfer   (1st Transfer)

3rd Transfer   (2nd Transfer)

4th Transfer   (3rd Transfer)

5th Transfer   (4th Transfer)

*FIG. 7A*        *FIG. 7B*        *FIG. 7C*
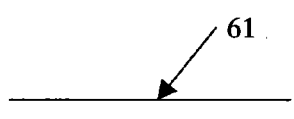 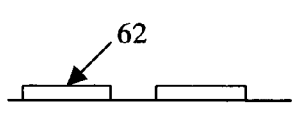 
*FIG. 7D*        *FIG. 7E*        *FIG. 7F*
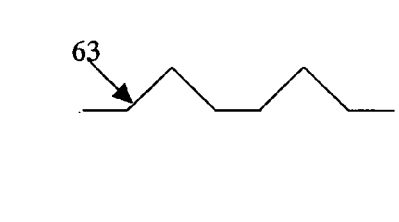 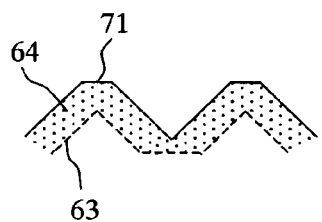 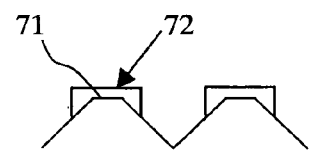
*FIG. 7G*        *FIG. 7H*        *FIG. 7I*
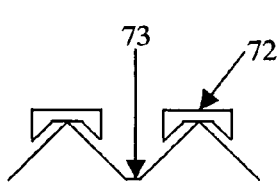 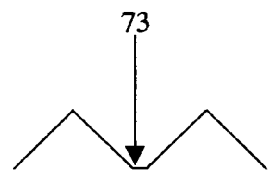 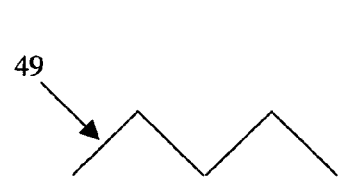

CORNER CUBE REFLECTOR, METHOD OF MAKING THE REFLECTOR AND REFLECTIVE DISPLAY DEVICE INCLUDING THE REFLECTOR

BACKGROUND OF THE INVENTION

1. Field of the Invention

The present invention relates to a corner cube reflector, a method of making the corner cube reflector, and a reflective display device including the corner cube reflector.

2. Description of the Related Art

Various configurations have been proposed for a reflective liquid crystal display device with a retroreflector (see Japanese Laid-Open Publication No. 2002-107519, Japanese Patent No. 3216584, and Japanese Laid-Open Publication No. 2002-287134, for example). Each of those reflective liquid crystal display devices uses no polarizers and therefore can conduct a display operation with increased brightness, and is also expected to achieve a display at a higher contrast ratio. As used herein, the "retroreflector" refers to an optical element that has a two-dimensional arrangement of very small unit elements so as to reflect any incoming light ray back to the source by way of multiple reflective surfaces thereof, no matter where the light ray has come from.

FIG. 16 shows an exemplary configuration for a reflective display device with a retroreflector as disclosed in Japanese Laid-Open Publication No. 2002-107519.

The reflective display device 9 shown in FIG. 16 includes an electrode 4, an alignment film 2, a liquid crystal layer 1, another alignment film 3, another electrode 5 and a retroreflector 8, which are stacked in this order (as viewed from over the display device by a viewer) between two substrates 6 and 7. The liquid crystal layer 1 is made of a scattering type liquid crystal material, which can switch between a transmitting state of transmitting the incoming light and a scattering state of scattering the incoming light.

Hereinafter, it will be described how the reflective display device 9 conducts a display operation in principle.

First, when the liquid crystal layer 1 is in the transmitting state, an incoming light ray 10, which has come from the vicinity of viewer's eyes, is transmitted through the substrate 6 and liquid crystal layer 1 while being refracted at the same time, incident on the retroreflector 8 and then reflected back from the retroreflector 8 as a reflected light ray 11. The reflected light ray 11 returns to the vicinity of the viewer's eyes after having been subjected to a similar refraction. Meanwhile, any other incoming light ray, which has come from elsewhere than the vicinity of the viewer's eyes, is retro-reflected by the retroreflector 8 right back to its source and never reaches the vicinity of the viewer's eyes. As a result, only the incoming light ray 10 that has come from the vicinity of the viewer's eyes is sensed by him or her, thereby achieving a black display state. Next, when the liquid crystal layer 1 is in the scattering state, light entering the liquid crystal layer 1 is either backscattered or forward scattered by, or transmitted through, the liquid crystal layer 1. The backscattered light returns to the viewer, thus contributing to the white display mode. On the other hand, the light rays that have been forward scattered by, or transmitted through, the liquid crystal layer 1 are retro-reflected by the retroreflector 8 and then enter the liquid crystal layer 1 in the scattering state again so as to be subject to the scattering action of the liquid crystal layer 1. Accordingly, most of the light that has been retro-reflected by the retroreflector 8 returns to the viewer and used to achieve the white display mode. In this manner, not only the light that has been backscattered by the liquid crystal layer 1 but also the light that has been either transmitted through, or forward scattered by, the liquid crystal layer 1 can be used for display purposes as well. Consequently, a display with a high brightness is achieved.

To operate the reflective display device 9 according to this principle, the arrangement pitch of the unit elements of the retroreflector 8 needs to be at most approximately equal to, and preferably smaller than, the pixel pitch. If the arrangement pitch of the unit elements is greater than the pixel pitch, then the incoming light ray 10, which has been transmitted through a pixel of the liquid crystal layer 1 and then retro-reflected by the retroreflector 8, may pass through another pixel of the liquid crystal layer 1 on the way back. In that case, the display might exhibit an abnormal state. For example, an incoming light ray that has passed a red color filter before reaching the retroreflector 8 may pass through a green or blue color filter on its way back, thus possibly causing a color mixture unintentionally.

The display performance of the reflective display device 9 heavily depends on the retroreflection property of the retroreflector 8. Among other things, the brightness of the black display mode is substantially determined by the retroreflectivity of the retroreflector 8 in many cases. That is to say, the higher the retroreflection property of the retroreflector 8, the greater the ratio of the brightness (or luminance) of the white display mode to that of the black display mode (i.e., the contrast ratio) and the higher the quality of the display realized.

Accordingly, for a reflective display device with a retroreflector such as the reflective display device 9 to achieve excellent display performance, the retroreflector 8 thereof needs to be a reflector that includes the unit elements at a sufficiently small arrangement pitch and has high retroreflection property.

Examples of reflectors functioning as the retroreflector 8 include a reflector obtained by densely packing spherical beads and a reflector obtained by regularly arranging unit elements such as corner cubes. Among these various types of reflectors, a reflector with an arrangement of corner cubes (which is often called a "corner cube reflector") is generally believed to achieve the highest possible retroreflection property. In a reflector densely packed with beads on the other hand, a gap is created inevitably between the beads, no matter how densely those beads are packed, and such a gap never contributes to retroreflection. For example, in a reflector, which is two-dimensionally packed most densely with beads of the same diameter, the percentage of the total area of those non-retroreflective portions (i.e., the gaps) to the overall surface area is estimated to be as high as slightly less than 10% (e.g., 9.3%) per unit area. Meanwhile, in a reflector with an arrangement of triangular pyramidal concave portions among various retroreflectors called "corner cube reflectors", the percentage of the total area of non-retroreflective portions to the overall surface area is estimated to be about 30% per unit area. As can be seen, in those reflectors obtained by densely packing beads or arranging triangular pyramidal concave portions, the percentage of the non-retroreflective portions to the overall reflector is too high to achieve sufficiently high retroreflectivity. On the other hand, in a square corner cube reflector (i.e., a reflector with a square corner cube array obtained by regularly arranging a plurality of unit elements, called "square cube corners", each consisting of three square planes that are opposed perpendicularly to each other) among various corner cube reflectors, the percentage of those non-retroreflective portions is estimated to be zero in a plan view, theoretically speaking. Thus, such a square corner cube reflector is expected to achieve sufficiently high retroreflection property. As used herein, the "corner cube" or "square cube corner" includes a structure having a substantially corner cube shape or a substantially square corner cube shape. More specifically, a square cube corner is a structure having at least three sets of mountain lines and valley lines.

In view of these considerations, if a square corner cube reflector is used as the retroreflector 8, then a high retroreflection property should be achieved theoretically speaking and a high-quality display could be realized.

Actually, however, it is extremely difficult even to make a square corner cube reflector at such a small arrangement pitch (of 250 μm or less, for example). None of the cited references mentioned above (namely, Japanese Laid-Open Publication No. 2002-107519, Japanese Patent No. 3216584, and Japanese Laid-Open Publication No. 2002-287134) provides a specific method of making a square corner cube reflector at that small arrangement pitch. Likewise, none of the other conventional methods of making square corner cubes mechanically such as a plate method and a pin bundling method is suitable to making a square corner cube reflector at that small arrangement pitch.

Meanwhile, Japanese Laid-Open Publication No. 7-205322 discloses a method of making a square corner cube array by a photochemical technique. In this method, a photoresist film is patterned with a mask having a plurality of equilateral triangular transparent regions. Each of these transparent regions of this mask has variable transmittance that gradually decreases from its center toward its periphery. By performing exposing and developing process steps with such a mask, a number of triangular pyramidal photoresist pattern elements are formed on a substrate. Then, the substrate, which is partially covered with those photoresist pattern elements, is etched by a predetermined technique so as to have a plurality of protrusions in the same shape as the photoresist pattern elements. In this manner, an array of corner cubes can be formed on the substrate.

Furthermore, a technique of forming a cubic corner cube of a very small size, consisting of three square planes that are opposed perpendicularly to each other, is described in "Precision Crystal Corner Cube Arrays for Optical Gratings Formed by (100) Silicon Planes With Selective Epitaxial Growth", Applied Optics Vol. 35, No. 19, pp. 3466–3470. According to this technique, an oxide film for use to control the crystal growth is locally provided on (111) planes of a silicon substrate to cause an epitaxial growth of crystals on the substrate, thereby forming an array of corner cubes of a very small size thereon.

Thus, according to the non-mechanical method disclosed in Japanese Laid-Open Publication No. 7-205322 or Applied Optics Vol. 35, No. 19, pp. 3466–3470, a square corner cube array can be formed at an even smaller arrangement pitch. To mass-produce square corner cube arrays, a die (made of Ni, for example) is preferably prepared by transferring the surface shape of the square corner cube array, obtained by the method described above, by an electroforming technique, for example. And if the surface shape of this die is transferred to a resin material, for example, by using the die as a master substrate, a lot of corner cube reflectors can be formed with the same die.

Nevertheless, it is still difficult at this time to make a square corner cube reflector at a small enough arrangement pitch and with a sufficiently high retroreflection property by any of the methods mentioned above.

The reason is that the retroreflection property of a square corner cube reflector depends heavily on the shape precision of each of the three square planes that make up one unit element (i.e., a single square corner cube), the planarity of each of those planes (i.e., the angular precision of each plane) or the precision of a joint portion between two adjacent planes, all of which will be referred to herein as "shape precision" collectively. According to the non-mechanical methods mentioned above, it is difficult to make a square corner cube array in an almost ideal shape, and therefore, the actual retroreflection property deteriorates significantly from its theoretical one.

More specifically, as for a square corner cube obtained by a photochemical method as disclosed in Japanese Laid-Open Publication No. 7-205322, it is difficult to ensure high plane precision (i.e., planarity). In that method, the plane precision of each side surface of a square corner cube depends on that of a triangular pyramidal photoresist pattern element on the substrate. However, to increase the plane precision of the photoresist pattern element, the processing steps of exposing and developing the photoresist layer should be controlled strictly enough by making the variation in transmittance or opacity of the mask constant, for example. Actually, though, such a strict process control is hard to realize.

Furthermore, according to the method utilizing the selective growth of silicon as disclosed in Applied Optics Vol. 35, No. 19, pp. 3466–3470, it is difficult to control the lateral growth of crystals. Also, a silicon dioxide film to be deposited on a silicon substrate to determine the square corner cube pattern and a film to be stacked thereon are likely deformed significantly at the end surfaces thereof. Thus, it is not easy to make a square corner cube array in its intended shape by such a method, either.

As described above, each of those approaches of increasing the shape precision of a square corner cube array, consisting of unit elements that are arranged at a sufficiently small pitch (of 200 μm or less, for example), for the purpose of improving the retroreflection property thereof has a limit. In particular, the smaller the arrangement pitch of the unit elements, the lower the shape precision of the square corner cube array and the more difficult it is to improve the retroreflection property sufficiently.

SUMMARY OF THE INVENTION

In order to overcome the problems described above, an object of the present invention is to provide a corner cube reflector, which has a plurality of unit elements that are arranged at a very small pitch so as to exhibit excellent retroreflection property, and also provide a method of making such a corner cube reflector easily.

Another object of the present invention is to provide a reflective display device including such a corner cube reflector, which realizes excellent display performance.

A corner cube reflector according to a preferred embodiment of the present invention preferably includes a two-dimensional arrangement of unit elements. The unit elements are preferably arranged at a pitch of 200 μm or less. As viewed in a direction from which incoming light is coming, each said unit element preferably has a peak point and a bottom point. A peak portion, including the peak point, preferably has an excessive portion and/or a missing portion as compared with an ideal peak portion of an ideal corner cube. The level of the peak point is preferably lower than that of the ideal peak point of the ideal corner cube. An average level difference $h_2$ between the level of the bottom point and that of an ideal bottom point of the ideal corner cube is preferably smaller than an average level difference $h_1$ between the level of the peak point and that of the ideal peak point.

In one preferred embodiment of the present invention, the ratio of the average level difference $h_1$ between the level of the peak point and that of the ideal peak point to the arrangement pitch is preferably greater than 0% and equal to or smaller than 2.5%.

In another preferred embodiment, the ratio of the average level difference $h_2$ between the level of the bottom point and that of the ideal bottom point to the arrangement pitch is preferably 0% to 1.7%.

In still another preferred embodiment, the level of the bottom point is preferably higher than that of the ideal bottom point.

In yet another preferred embodiment, the unit elements are preferably square corner cubes.

In yet another preferred embodiment, the arrangement pitch is preferably 20 μm or less.

A master substrate according to a preferred embodiment of the present invention preferably includes a two-dimensional arrangement of unit elements, which are preferably corner cubes. The corner cubes are preferably arranged at a pitch of 200 μm or less. As viewed in a direction from which incoming light is coming, each said corner cube preferably has a peak point and a bottom point. A bottom portion, including the bottom point, preferably has an excessive portion and/or a missing portion as compared with an ideal bottom portion of an ideal corner cube. The level of the bottom is preferably higher than that of the ideal bottom point of the ideal corner cube. An average level difference $h_1$ between the level of the peak point and that of an ideal peak point of the ideal corner cube is preferably smaller than an average level difference $h_2$ between the level of the bottom point and that of the ideal bottom point.

A method of making a master substrate according to a preferred embodiment of the present invention preferably includes the step of preparing a corner cube array master that has a surface defining a two-dimensional arrangement of unit elements. The unit elements are preferably arranged at a pitch of 200 μm or less, each said unit element preferably has a peak point and a bottom point as viewed in a direction from which incoming light is coming, and a peak portion, including the peak point, and/or a bottom portion, including the bottom point, preferably have an excessive portion and/or a missing portion as compared with an ideal peak portion or an ideal bottom portion of an ideal corner cube array. The method preferably further includes the steps of: making a first transfer by transferring the surface of the corner cube array master; and obtaining a $k^{th}$ transfer as the master substrate by sequentially making an $(n+1)^{th}$ transfer from an $n^{th}$ transfer with n incremented one by one from 1 to k−1, where k and n are both integers, $n \geq 1$, and $k \geq 2$. In the corner cube array master, k is preferably an odd number if an average level difference $h_1$ between the level of the peak point and that of an ideal peak point of the ideal corner cube is greater than an average level difference $h_2$ between the level of the bottom point and that of the ideal bottom point of the ideal corner cube, but k is preferably an even number if the average level difference $h_1$ is smaller than the average level difference $h_2$.

In a method of making corner cube reflectors according to a preferred embodiment of the present invention, the corner cube reflectors are preferably made using a master substrate formed by the method according to the preferred embodiment described above.

A method of making a corner cube reflector according to a preferred embodiment of the present invention preferably includes the step of preparing a corner cube array master that has a surface defining a two-dimensional arrangement of unit elements. The unit elements are preferably arranged at a pitch of 200 μm or less, each said unit element preferably has a peak point and a bottom point as viewed in a direction from which incoming light is coming, and a peak portion, including the peak point, and/or a bottom portion, including the bottom point, preferably have an excessive portion and/or a missing portion as compared with an ideal peak portion or an ideal bottom portion of an ideal corner cube array. The method preferably further includes the steps of: making a first transfer by transferring the surface of the corner cube array master; and obtaining a $k^{th}$ transfer by sequentially making an $(n+1)^{th}$ transfer from an $n^{th}$ transfer with n incremented one by one from 1 to k−1, where k and n are both integers, $n \geq 1$, and $k \geq 2$. In the corner cube array master, k is preferably an odd number if an average level difference $h_1$ between the level of the peak point and that of an ideal peak point of the ideal corner cube is greater than an average level difference $h_2$ between the level of the bottom point and that of the ideal bottom point of the ideal corner cube, but k is preferably an even number if the average level difference $h_1$ is smaller than the average level difference $h_2$. The method preferably further includes the step of obtaining the corner cube reflector by using the $k^{th}$ transfer as a master substrate.

In one preferred embodiment of the present invention, at least a surface portion of the corner cube array master is preferably made of a cubic crystalline material, and the unit elements of the corner cube array master are preferably obtained by patterning the surface portion.

In another preferred embodiment, the crystalline material preferably includes gallium arsenide.

In still another preferred embodiment, the unit elements of the corner cube array master are preferably square corner cubes including surfaces that are defined by {100} families of planes of the crystalline material.

In yet another preferred embodiment, the step of preparing the corner cube array master preferably includes the steps of: defining solid shape unit elements on a substrate including the crystalline material; and growing crystals by feeding a first active species, including an element contained in the crystalline material, onto the substrate.

A method of making a corner cube reflector according to another preferred embodiment of the present invention preferably includes the step of preparing a corner cube array master that has a surface defining a two-dimensional arrangement of unit elements. The unit elements are preferably arranged at a pitch of 200 μm or less, each said unit element preferably has a peak point and a bottom point as viewed in a direction from which incoming light is coming, a bottom portion, including the bottom point, preferably has an excessive portion and/or a missing portion as compared with an ideal bottom portion of an ideal corner cube, the level of the bottom point is preferably higher than that of the ideal bottom point of the ideal corner cube, and an average level difference $h_1$ between the level of the peak point and that of an ideal peak point of the ideal corner cube is preferably smaller than an average level difference $h_2$ between the level of the bottom point and that of the ideal bottom point. The method preferably further includes the steps of: making a first transfer by transferring the surface of the corner cube array master; and obtaining a $k^{th}$ transfer by sequentially making an $(n+1)^{th}$ transfer from an $n^{th}$ transfer with n incremented one by one from 1 to k−1, where k and n are both integers, k is an even number, n≧1, and k≧2, and at least one of the $n^{th}$ transfers (where n=1 through k−1) is made of a resin material. The method preferably further includes the step of obtaining the corner cube reflector by using the $k^{th}$ transfer as a master substrate.

A corner cube reflector according to a preferred embodiment of the present invention is preferably made by the method according to any of the preferred embodiments of the present invention described above.

A master substrate according to a preferred embodiment of the present invention is preferably made by the method according to the preferred embodiment described above.

A reflective display device according to a preferred embodiment of the present invention preferably includes: a retroreflective layer; and a modulation layer, which is provided closer to a viewer than the retroreflective layer is and which is switchable between first and second states with mutually different optical properties. The retroreflective layer preferably includes a two-dimensional arrangement of unit elements. The unit elements are preferably arranged at a pitch of 200 μm or less. As viewed in a direction from which incoming light is coming, each said unit element preferably has a peak point and a bottom point. A peak portion, including the peak point, preferably has an excessive portion and/or a missing portion as compared with an ideal peak portion of an ideal corner cube. The level of the peak point is preferably lower than that of the ideal peak point of the ideal corner cube. An average level difference $h_2$ between the level of the bottom point and that of an ideal bottom point of the ideal corner cube is preferably smaller than an average level difference $h_1$ between the level of the peak point and that of the ideal peak point.

A corner cube array structure according to a preferred embodiment of the present invention preferably includes a two-dimensional arrangement of unit elements. The unit elements are preferably arranged at a pitch of 200 μm or less. As viewed in a direction from which incoming light is coming, each said unit element preferably has a peak point and a bottom point. The ratio of an average level difference $h_2$ between the level of the bottom point and that of an ideal bottom point of an ideal corner cube to the arrangement pitch is preferably 1.7% or less. The ratio of an average level difference $h_1$ between the level of the peak point and that of an ideal peak point of the ideal corner cube to the arrangement pitch is preferably 1.7% or less.

As used herein, the "corner cube array structure" is a generic term for any structure including a corner cube array and may refer to not only a corner cube reflector but also a master substrate or a master for use to fabricate the corner cube reflector.

According to various preferred embodiments of the present invention described above, the retroreflection property of a corner cube reflector, having a plurality of unit elements that are arranged at a very small pitch, can be improved. Among other things, the present invention is particularly advantageous in that the retroreflection property of a corner cube reflector is improvable even without increasing the shape precision thereof.

In addition, according to various preferred embodiments of the present invention described above, such a corner cube reflector can be obtained easily.

Furthermore, if a retroreflector is formed using such a corner cube reflector, then a reflective display device including such a retroreflector can exhibit improved display performance.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 7A through 7I are cross-sectional views illustrating structures obtained by the process steps shown in FIGS. 6A through 6I, respectively.

DETAILED DESCRIPTION OF PREFERRED EMBODIMENTS

Figure 1A:
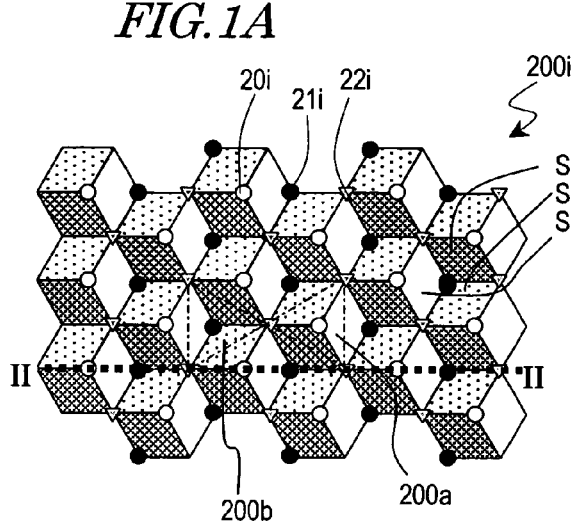
FIGS. 1A and 1B are respectively a plan view and a perspective view illustrating a portion of an ideal square corner cube array.

As described above, the smaller the arrangement pitch of a corner cube array, the more difficult it is to define sufficiently precisely the unit elements (i.e., corner cubes) that make up the corner cube array. Accordingly, the actual shape of a corner cube array obtained is at least partially deformed as compared with the ideal shape thereof.

Thus, the present inventors carried out an extensive research to find what type of corner cube array could exhibit a high retroreflection property even if its shape was partially deformed compared with the ideal one. As a result, the present inventors discovered that the retroreflection property was improvable by controlling the location of such a deformed portion on the reflective surfaces of each corner cube.

More particularly, the present inventors discovered that a corner cube array with a sufficiently high retroreflection property could be obtained by arranging such a deformed portion around a top of a corner cube and a portion of a corner cube reflective surface with a better shape (i.e., closer to its ideal shape) around a bottom of the corner cube, respectively. As used herein, the "top" of a corner cube refers to a peak point (i.e., a point that is closest to the source of an incoming light ray) while the "bottom" of a corner cube refers to a bottom point (i.e., a point that is farthest away from the source of an incoming light ray).

Hereinafter, a square corner cube array will be described by way of a specific example.

First, the configuration of a square corner cube array 200i with an ideal shape will be described with reference to FIGS. 1A and 1B. The square corner cube array 200i has a structure in which a plurality of square corner cube unit elements 200U, each consisting of three planes S1, S2 and S3 defined by {100} families of planes, of grown crystals, are arranged as an array. The three planes S1, S2 and S3 that make up one unit element 200U are three substantially square planes that are opposed perpendicularly to each other. Also, the square corner cube array 200i obtained in this manner has a solid shape as a combination of peak portions 200a, each including a peak point 20i, and bottom portions 200b, each including a bottom point 21i. When viewed from over the square corner cube array 200i, each square corner cube unit element 200U has the shape of a rectangular hexagon consisting of the peak points 20i and saddle points 22i or the bottom points 21i and saddle points 22i. The arrangement pitch of the square corner cube unit elements 200U (i.e., the shortest distance between two adjacent bottom points 21i) is preferably at most 200 μm, more preferably 20 μm or less.

Figure 1B:
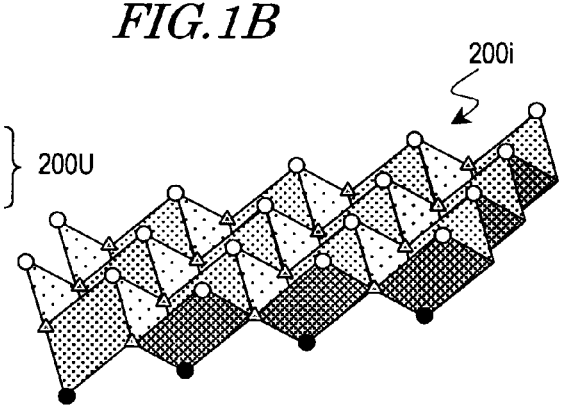
Figure 2:
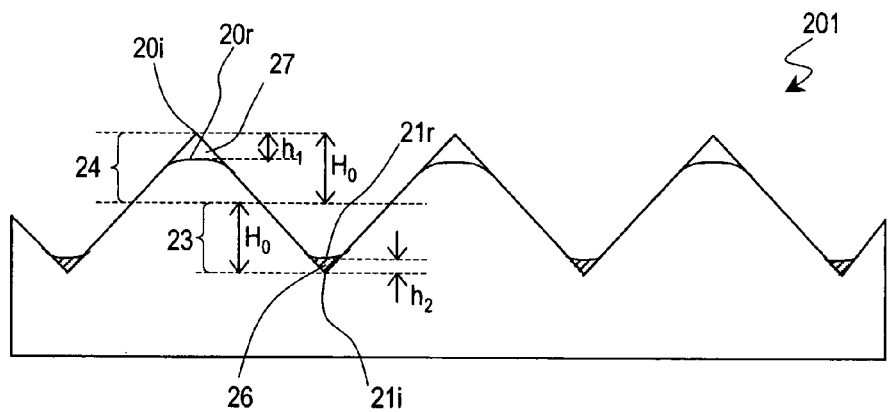
FIG. 2 is a cross-sectional view schematically illustrating an exemplary configuration of a square corner cube reflector according to a preferred embodiment of the present invention.

On the other hand, a corner cube reflector 201 according to a preferred embodiment of the present invention has a configuration such as that shown in FIG. 2. The cross section shown in FIG. 2 corresponds to a cross section of the corner cube array 200i shown in FIG. 1A as viewed on a plane II—II shown in FIG. 1A. In the corner cube reflector 201, the unit elements are also arranged at a pitch of at most 200 μm. Comparing the shape of the corner cube reflector 201 with that of the corner cube array 200i shown in FIGS. 1A and 1B, it can be seen that a portion 24 around a peak point (which will be referred to herein as a "peak portion") is partially missing, which portion 27 will be referred to herein as a "missing portion". When the peak portion 24 has such a missing portion. 27, the level of the peak point 20r is lower than that of the ideal peak point 20i. Accordingly, the peak portion 24 has a rounded shape. Meanwhile, comparing the shape of the corner cube reflector 201 with that of the corner cube array 200i shown in FIGS. 1A and 1B, it can also be seen that a portion 23 around a bottom point 21r (which will be referred to herein as a "bottom portion") has an "unetched portion", thus creating an unsharpened edge between the planes defining the bottom point. Such an unetched portion 26 will be referred to herein as an "excessive portion". When the bottom portion 23 has such an excessive portion 26, the level of the bottom point 21r is higher than that of the ideal bottom point 21i.

Figure 17A:
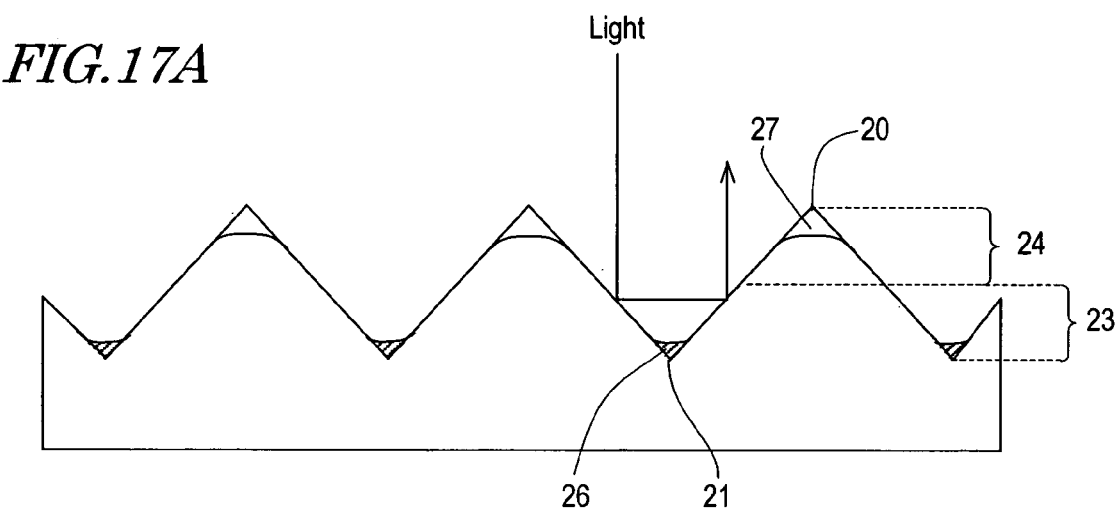
FIGS. 17A and 17B are cross-sectional views showing the locations of peak points, peak portions, bottom points and bottom portions in a corner cube reflector.
Figure 17B:
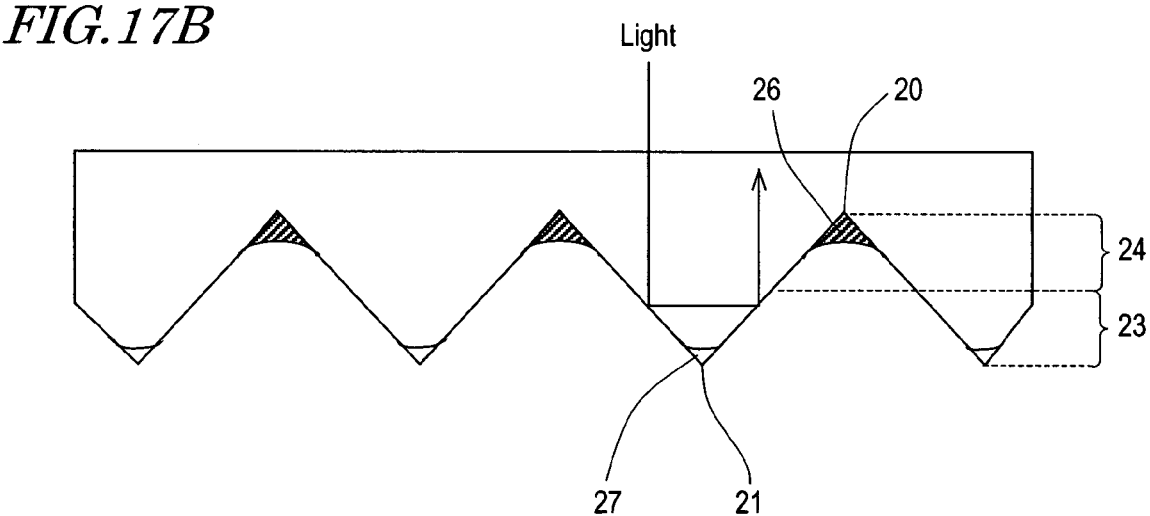

As shown in FIG. 2, the "bottom portion 23" is a triangular pyramidal region, of which the vertex is defined by an ideal bottom point 21i of the corner cube array 200i and of which the height $H_0$ is approximately a half of the distance between the ideal bottom point 21i and the ideal peak point 20i. On the other hand, the "peak portion 24" is a triangular pyramidal region, of which the vertex is defined by the ideal peak point 20i and of which the height is equal to $H_0$. Furthermore, the peak point 20, bottom point 21, peak portion 24 and bottom portion 23 are uniquely defined by the direction from which the incoming light ray is coming as shown in FIGS. 17A and 17B. Accordingly, if the corner cube reflector 201 is made of a translucent material and if the incoming light ray enters the corner cube reflector 201 through the non-corner cube array side thereof, then the peak portion 24 will have the excessive portion 26 and the bottom portion 23 will have the missing portion 27 as shown in FIG. 17B.

Supposing planes of the corner cube reflector 201 with non-ideal shapes (i.e., planes other than those contributing to retroreflection) are called "unwanted planes", the percentage of the unwanted planes created by the excessive portions 26 at the bottom portions 23 is smaller than that of the unwanted planes created by the missing portions 27 at the peak portions 24. In other words, the bottom portions 23 are closer to the ideal shape than the peak portions 24 are.

In the corner cube reflector 201, the degrees of deformation at the peak and bottom portions 24 and 23 (i.e., the percentages of the unwanted planes thereof) may be compared with each other by comparing the average level difference $h_1$ between the peak point 20r and the ideal peak point 20i with the average level difference $h_2$ between the bottom point 21r and the ideal bottom point 21i. These level differences $h_1$ and $h_2$ can be obtained by measuring the surface roughness at the peak and bottom portions 24 and 23 with an atomic force microscope (AFM), for example. According to this method, the level difference $h_2$ at the bottom portions 23 should be smaller than the level difference $h_1$ at the peak portions 24 in this corner cube reflector 201.

The corner cube reflector 201 according to this preferred embodiment of the present invention has such a configuration and therefore achieves a sufficiently high retroreflection property. Among other things, the corner cube reflector 201 is particularly advantageous in that the retroreflection property is improvable even without increasing the shape precision of the reflective planes thereof. Thus, by using this corner cube reflector 201, a reflective display device with excellent display performance is realized. Furthermore, the corner cube reflector 201 has a rounded peak portion 24 and therefore can be handled easily and conveniently.

The arrangement pitch of the corner cube reflector 201 is preferably 20 μm or less. In particular, if the arrangement pitch of the corner cube reflector 201 being used in a display device is 20 μm or less, then the color mixture problem described above can be avoided. However, the arrangement pitch is preferably at least equal to 100 nm. This is because if the arrangement pitch were less than 100 nm, then it would be difficult to make the corner cube reflector with high precision. More preferably, the arrangement pitch is at least equal to 500 nm.

To further improve the retroreflection property of the corner cube reflector 201, the ratio of the average level difference $h_2$ at the bottom portions 23 to the arrangement pitch is preferably 0% to 1.7% and the ratio of the average level difference $h_1$ at the peak portions 24 to the arrangement pitch is preferably greater than 0% but equal to or smaller than 2.5%.

In making a plurality of corner cube reflectors 201, a master substrate is preferably used. The master substrate is preferably made of Ni or any other suitable material with high mechanical strength. The master substrate preferably has a surface, which is the inversion of the reflective surfaces of the corner cube reflector 201. That is to say, the master substrate preferably has a two-dimensional arrangement of corner cubes, which are arranged at a pitch of 200 µm or less. Also, the bottom portion of each of those corner cubes preferably has an excessive portion. Accordingly, the level of the bottom point is preferably higher than that of the ideal bottom point of the ideal corner cube. The average level difference $h_1$ at the peak portions is preferably greater than the average level difference $h_2$ at the bottom portions.

The corner cube reflector 201 and the master substrate to make the corner cube reflectors 201 may be obtained in the following manner.

Figure 3A:
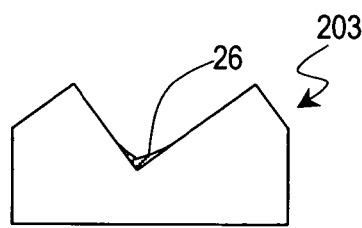
FIGS. 3A through 3F show respective process steps for making a corner cube reflector according to a preferred embodiment of the present invention.

First, as shown in FIG. 3A, a corner cube array master 203 with a two-dimensional arrangement of unit elements (e.g., square corner cubes in this example) is prepared. In the master 203, the unit elements are arranged at a pitch of 200 µm or less. Each unit element has a peak portion 24 and a bottom portion 23. The peak portion 24 has a missing portion (not shown) and the bottom portion 23 has an excessive portion 26. The volume of the missing portion is smaller than that of the excessive portion. Accordingly, the average level difference $h_1$ between the level of the peak point 20r and that of the ideal peak point 20i is smaller than the average level difference $h_2$ between the level of the bottom point 21r and that of the ideal bottom point 21i.

Figure 3B:
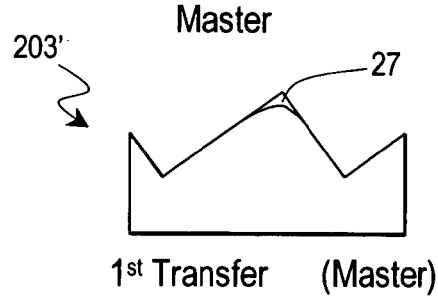
Figure 3C:
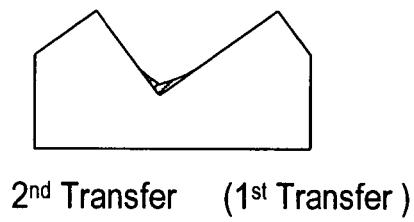
Figure 3D:
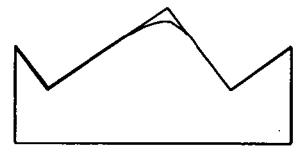
Figure 3E:
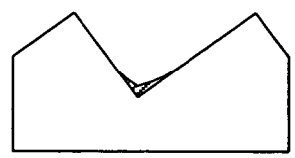
Figure 3F:
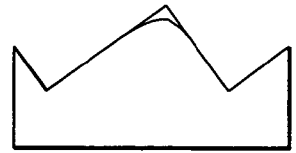

Next, as shown in FIG. 3B, the corner cube array master 203 is transferred to make a first transfer. Thereafter, a second transfer is made from the first transfer as shown in FIG. 3C. Subsequently, by using this second transfer as a master substrate, a third transfer to be the corner cube reflector 201 as a final product is obtained as shown in FIG. 3D. It should be noted that the number of times of transfers is not limited to three times. Alternatively, by using the corner cube array master 203 as a master substrate as it is, a first transfer to be the corner cube reflector 201 may be obtained. Speaking more generally, a $k^{th}$ transfer (where k is an even number) having the same surface shape as the corner cube array master 203 may be formed as shown in FIGS. 3C and 3E and used as the master substrate by sequentially making an $(n+1)^{th}$ transfer from an $n^{th}$ transfer with n incremented one by one from 1 to k−1, where k and n are both integers, n≧1, and k≧2. By transferring the surface shape of this master substrate, a $(k+1)^{th}$ transfer (where k is an even number), of which the surface shape is the inversion of that of the corner cube array master 203, can be obtained as shown in FIGS. 3D and 3F. If necessary, a reflective metal layer may be deposited on the surface of the $(k+1)^{th}$ transfer obtained. Then, the corner cube reflector 201 can be obtained.

Alternatively, a corner cube array master 203' may also be prepared as shown in FIG. 3B. In the corner cube array master 203', the unit elements are arranged at a pitch of 200 µm or less. Each unit element has a peak portion 24 and a bottom portion 23. The peak portion 24 has a missing portion and the bottom portion 23 has an excessive portion (not shown). The volume of the missing portion is larger than that of the excessive portion. Accordingly, the average level difference $h_1$ between the level of the peak point 20r and that of the ideal peak point 20i is greater than the average level difference $h_2$ between the level of the bottom point 21r and that of the ideal bottom point 21i. In that case, if the first transfer of the corner cube array master 203' is used as a master substrate, a second transfer to be the corner cube reflector 201 can be obtained. Optionally, the master substrate may be obtained by transferring the corner cube array master 203' an odd number of times. That is to say, a $k^{th}$ transfer (where k is an odd number), of which the surface shape is the inversion of that of the cube array master 203', may be formed as shown in FIGS. 3C and 3E by sequentially making an $(n+1)^{th}$ transfer from an $n^{th}$ transfer with n incremented one by one from 1 to k−1, where k and n are both integers, n≧1, and k≧2. By transferring the surface shape of this master substrate, a $(k+1)^{th}$ transfer to be the corner cube reflector 201 can be obtained as shown in FIGS. 3D and 3F.

In this manner, according to the method of this preferred embodiment, a square corner cube reflector 201, in which either the peak portions 24 or the bottom portions 23 having the smaller number of unwanted non-retroreflective surfaces in the square corner cube array master 203 or 203' are used as the bottom portions 23, is obtained as a final product by controlling the number of times of transfers. Thus, according to this method, a corner cube reflector 201 with excellent retroreflection property can be obtained easily. Among other things, this method is particularly advantageous in that the retroreflection property is improvable without performing any complicated process to increase the shape precision of the corner cube array.

Hereinafter, a method for evaluating the retroreflection property of a corner cube reflector will be described with reference to the accompanying drawings.

Method for Evaluating Retroreflection Property

According to the present invention, the retroreflection property of a corner cube reflector is evaluated by measuring the retroreflectivity thereof. The retroreflectivity may be measured with an evaluation system 300 such as that shown in FIG. 4, which has basically the same configuration as an incident microscope.

The evaluation system 300 includes a stage 119 to fix a sample retroreflector 120 thereon, an objective lens 121 (with a focusing angle of 7.5 degrees, for example) provided perpendicularly to the stage 119, a light source 124 for emitting white light, a half mirror 122 and a photodetector 123. The half mirror 122 is arranged such that the light that has been emitted from the light source 124 is reflected by the mirror 122 and incident perpendicularly to the sample retroreflector 120 fixed on the stage 119. The photodetector 123 is provided right over the objective lens 121 so as to receive the light that has been reflected perpendicularly from the sample retroreflector 120 and then passed through the objective lens 121.

Hereinafter, it will be described how to measure the retroreflectivity Rr with this evaluation system 300.

First, a sample retroreflector 120 (with a size of 10 mm to 200 mm, for example) to evaluate is prepared. The sample retroreflector 120 may be either a corner cube array or a retroreflector obtained by depositing a metal layer on the reflective surfaces of a corner cube array.

Next, this sample retroreflector 120 is fixed on the stage 119. Subsequently, the light that has been emitted from the light source 124 is reflected from the half mirror 122 and then incident perpendicularly onto the sample retroreflector 120 by way of the objective lens 121 with a focusing angle of 7.5 degrees. In this case, a beam spot 125 (with a diameter D of 100 µm, for example) is formed by the incident light on the sample retroreflector 120. The incident light is then reflected by the sample retroreflector 120. In this reflected light, a portion that has been reflected substantially perpendicularly is received by the photodetector 123 by way of the objective lens 121. As a result, the intensity $I_1$ of the substantially perpendicularly reflected light is measured.

Meanwhile, a dielectric mirror (not shown) (with a size of 10 mm to 100 mm, for example) is prepared as a reference and placed on the stage 119 of the evaluation system 300 instead of the sample retroreflector 120. Subsequently, as in the sample retroreflector 120, the light that has been emitted from the light source 124 is reflected from the half mirror 122 and then incident perpendicularly onto the dielectric mirror by way of the objective lens 121. The light reflected substantially perpendicularly by the dielectric mirror is received by the photodetector 123 by way of the objective lens 121. As a result, the intensity $I_r$ of the substantially perpendicularly reflected light is measured.

Thereafter, an $I_1/I_r$ ratio, i.e., the ratio of the intensity $I_1$ of the light reflected by the sample retroreflector 120 to the intensity $I_r$ of the light reflected by the dielectric mirror, is calculated. This $I_1/I_r$ ratio (%) will be referred to herein as the retroreflectivity Rr of the sample retroreflector 120.

In the evaluation method of this preferred embodiment, the intensity $I_1$ of the light reflected from the sample retroreflector 120 is measured first, and then the intensity $I_r$ of the light reflected from the dielectric mirror is measured. Alternatively, the intensity $I_r$ may be measured first.

This evaluation method is supposed to be applied to evaluating a corner cube array (or a retroreflector) for use in a display panel that may be used personally, in particular. Such a retroreflector has an arrangement pitch, which is approximately equal to, or smaller than, the pixel pitch of a display panel, for example. Accordingly, the sample retroreflector 120 to be evaluated by this evaluation method preferably has an arrangement pitch of at most 200 µm, more preferably 20 µm or less.

To make a more reliable evaluation with this evaluation system, the diameter D of the beam spot 125, formed by the emission of the light source 124 on the sample retroreflector 120, is preferably controlled so as to be at least equal to the arrangement pitch of the unit elements of the sample retroreflector 120. This is because if the beam spot diameter D were smaller than the arrangement pitch of the unit elements, then the retroreflectivity Rr measured would vary greatly according to the specific location of the beam spot 125 on the sample retroreflector 120. For example, if the beam spot 125 is formed at the center of a unit element, the retro-reflectivity Rr measured will be high. On the other hand, if the beam spot 125 is formed around the periphery of a unit element (i.e., around the junction between two adjacent unit elements), then the retro-reflected light is less likely to enter the photodetector 123 and the retroreflectivity Rr measured will decrease. In that case, it will be more difficult to evaluate the retroreflection property of the sample retroreflector 120 accurately. More preferably, the diameter D of the beam spot 125 is at least three times as large as the arrangement pitch. In that case, the retroreflectivity Rr measured will be affected to a much lesser degree by the specific location of the beam spot 125 or the variation in retroreflection property between the unit elements. Thus, the evaluation can be made with much more reliability. The diameter D of the beam spot 125 is even more preferably at least five times as large as the arrangement pitch.

The focusing angle of the objective lens 121 does not have to be 7.5 degrees but may be controlled appropriately so as to form a beam spot 125 of the preferred size mentioned above. Nevertheless, the focusing angle of the objective lens 121 is preferably no greater than 30 degrees. This is because if the focusing angle exceeded 30 degrees, then the beam spot 125 formed on the sample retroreflector 120 would decrease its size too much. In that case, the retroreflectivity Rr measured would vary significantly according to the specific location of the beam spot 125. In addition, even the non-retro-reflected returned light (such as scattered light that has deviated from the three planes making up one square corner cube) could be more likely focused unintentionally.

This evaluation method cannot be used effectively to evaluate a retroreflector consisting of unit elements of a big size (e.g., a retroreflector for use in a road sign) because in that case, it is difficult to form the beam spot 125 in an appropriate size as described above. However, this evaluation method would also be effective if an objective lens 121 of a special big size were available to cope with such a large diameter D of the beam spot 125.

Embodiment 1

Hereinafter, a corner cube reflector according to a first specific preferred embodiment of the present invention will be described.

Figure 5A:
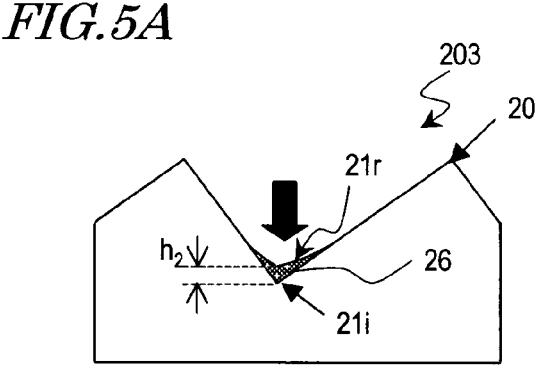
FIG. 5A is a cross-sectional view of a corner cube array master according to a first specific preferred embodiment of the present invention.
Figure 5B:
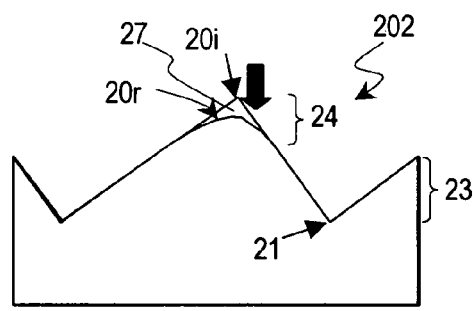
FIGS. 5B and 5C are cross-sectional views of a corner cube reflector according to the first preferred embodiment of the present invention.
Figure 5C:
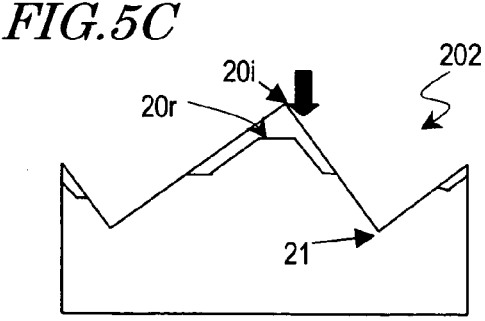

As shown in FIGS. 5B or 5C, the corner cube reflector 202 of this preferred embodiment includes a bottom portion with almost no unwanted planes and a peak portion, which has a rounded shape due to a deformed portion as shown in FIG. 5B or a partially missing portion as shown in FIG. 5C. Accordingly, the level of the peak point 20r is lower than that of the ideal peak point 20i. The unit elements may have an arrangement pitch of 10 µm, for example.

The corner cube reflector 202 of this preferred embodiment may be fabricated by the following method, for example.

Hereinafter, a method of making the corner cube array master 203 will be described with reference to FIGS. 6A through 6I and FIGS. 7A through 7I. FIGS. 6A through 6I are plan views of the substrate in respective process steps. FIGS. 7A through 7I are cross-sectional views schematically showing the surface portion of the substrate in the respective process steps as viewed on the plane VII—VII shown in FIG. 6I.

Figure 6A:
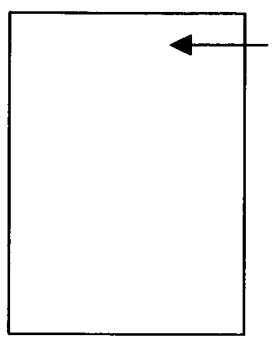
FIGS. 6A through 6I are plan views illustrating respective process steps for making a corner cube reflector according to the first preferred embodiment of the present invention.

First, a substrate 61, made up of GaAs crystals having a sphalerite structure, is prepared as the cubic single crystalline substrate as shown in FIG. 6A. The surface of the substrate 61 is substantially parallel to the {111}B planes and is preferably mirror-polished as shown in FIG. 7A.

Figure 6B:
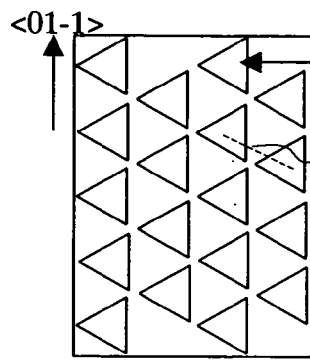

Next, as shown in FIGS. 6B and 7B, the surface of the substrate 61 is spin-coated with a positive photoresist layer with a thickness of about 1 µm. The photoresist layer may be made of OFPR-800 (produced by Tokyo Ohka Kogyo Co., Ltd.), for example. Subsequently, after the photoresist layer has been pre-baked at about 100° C. for 30 minutes, a photomask is arranged on the photoresist layer to expose the photoresist layer to radiation through the mask.

Figure 8:
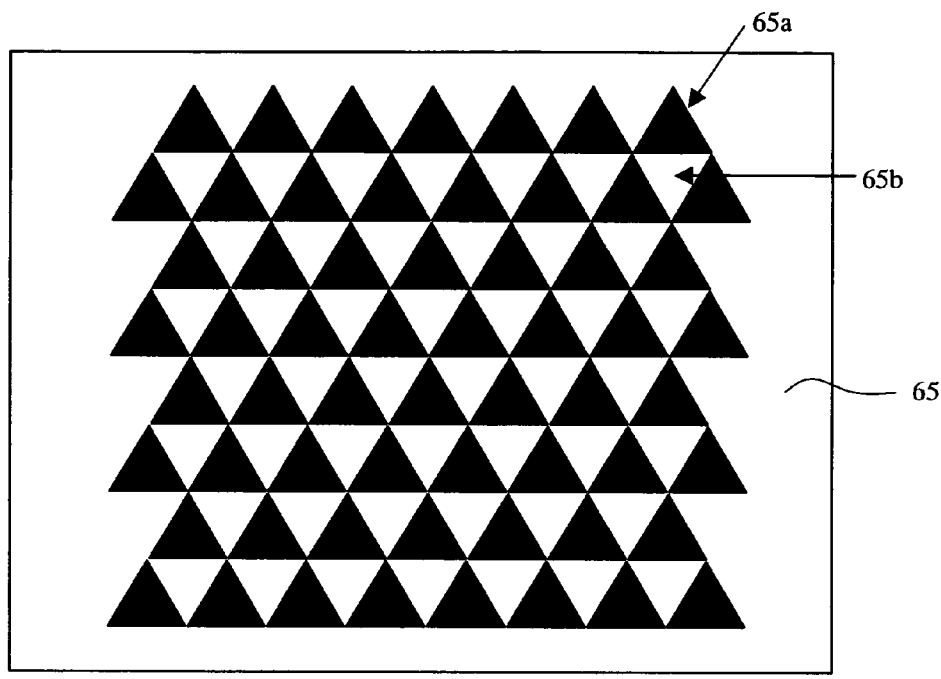
FIG. 8 is a plan view illustrating a photomask for use in the method of making a corner cube array according to the first preferred embodiment.

In this preferred embodiment, a photomask 65 such as that shown in FIG. 8 may be used. As shown in FIG. 8, in this photomask 65, equilateral triangular opaque regions 65a and inverse equilateral triangular transmissive regions 65b are alternately arranged in each of the three directions defined by the three sides of the triangles. The photomask 65 is arranged on the substrate 61 such that one of the three sides of each equilateral triangular pattern element representing an opaque region 65a is parallel to the <01-1> direction of the GaAs crystals. It should be noted that the negative sign preceding a direction index indicates herein that the direction index is negative. In this preferred embodiment, each equilateral triangular pattern element representing an opaque region 65a has a length of about 10 μm each side.

Thereafter, the exposed photoresist layer is developed with a developer NMD-3%:TMAH (tetramethylammonium hydroxide) 2.38% (produced by Tokyo Ohka Kogyo Co., Ltd.), for example, thereby forming a photoresist pattern 62 on the substrate 61 as shown in FIGS. 6B and 7B. The photoresist pattern 62, which has been defined by using the photomask 65 shown in FIG. 8, is arranged on the substrate 61 such that one side of each equilateral triangular pattern element (i.e., the opaque region 65a) is parallel to the <01-1> direction of the GaAs crystals. In other words, the photoresist pattern 62 is arranged such that the three sides of each equilateral triangular pattern element thereof are parallel to {100} planes of the GaAs crystals.

In this preferred embodiment, the size of corner cubes to form may be controlled according to the arrangement pitch of the photoresist pattern 62. More specifically, the arrangement pitch of the corner cubes becomes approximately equal to the pitch P0 of the masking elements of the photoresist pattern 62. In this preferred embodiment, the pitch P0 is preferably about 10 μm.

It should be noted that the pattern of the etching mask layer is not limited to that shown in FIG. 6B but may be any of various other patterns. However, to form corner cubes in their intended shape, the predetermined point (e.g., the median point) of each masking element of the photoresist pattern 62 in the etching mask layer is preferably located at a honeycomb lattice point. As used herein, the "honeycomb lattice points" refer to the vertices and median points of respective rectangular hexagons when a predetermined plane is densely packed with the hexagons of completely the same shape with no gaps left between them. The "honeycomb lattice points" also correspond to the intersections between first and second groups of parallel lines that are defined in a predetermined plane. In this case, when the first group of parallel lines extend in a first direction and are spaced apart from each other at regular intervals, the second group of parallel lines extend in a second direction so as to define an angle of 60 degrees with the first group of parallel lines and are spaced apart from each other at the same regular intervals as the first group of parallel lines. Also, each masking element of the etching mask layer preferably has a planar shape that is symmetrical around a three-fold rotation axis (e.g., a triangular or hexagonal shape).

Figure 6C:
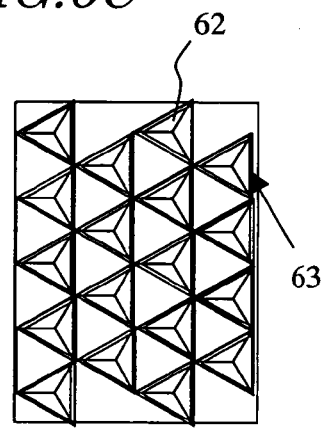

Next, as shown in FIGS. 6C and 7C, the substrate 61 is wet-etched while an etchant is stirred with a magnet stirrer. In this preferred embodiment, the wet etching process may be carried out at a temperature of about 20° C. for approximately 60 seconds using a mixture of $NH_4OH:H_2O_2:H_2O=1:2:7$ as the etchant.

Figure 9:
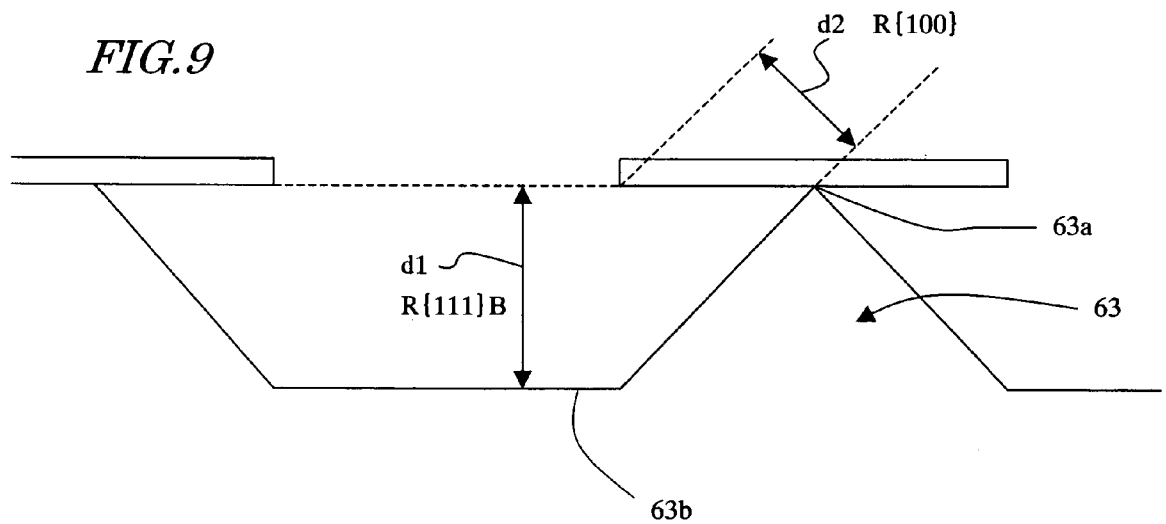
FIG. 9 is a schematic cross-sectional view showing how to define a solid shape element in the method of making a corner cube array according to the first preferred embodiment.

In this etching process, the {100} planes of the GaAs crystals, including the (100), (010) and (001) planes, are less easy to etch than the other crystallographic planes thereof. Thus, the etching process advances anisotropically so as to expose the {100} planes. However, in this etching process, the etch depth d1 of an opening as defined by one of the {111}B planes and the etch depth d2 of the same opening as defined by one of {100} planes preferably satisfy the relationship shown in FIG. 9.

As a result, when a vertex 63a is formed, a solid shape element 63 including a bottom (i.e., a flat portion) 63b is completed. In this manner, in this preferred embodiment, a plurality of convex portions 63, each having a vertex under its associated masking element 62, are formed as solid shape elements on the surface of the substrate 61 as shown in FIGS. 6C and 7C.

Each of these convex portions 63 preferably has the shape of a triangular pyramid, which is made up of three rectangular isosceles triangular planes to be defined by three {100} planes that are opposed perpendicularly to each other. That is to say, each convex portion 63 has a triangular pyramidal shape corresponding to one corner of a cube. Also, these convex portions 63 are arranged such that their vertices are located on the honeycomb lattice points and so as to have their arrangement pitch substantially equalized with the pitch P0 (e.g., 10 μm in this preferred embodiment) of the masking elements of the resist pattern 62.

It should be noted that the unevenness to be created by the wet etching process is changeable with an etching condition such as the type of the etchant adopted or the etch time. For example, if the etch rate ratio $R\{111\}B/R\{100\}$ is relatively high (e.g., about 1.8 or more), then the resultant flat portion 63b will have a decreased area as compared with the preferred embodiment shown in FIG. 7C. Also, the solid shape elements arranged do not have to be a plurality of convex portions as described above but may also be a plurality of concave portions or a combination of concave and convex portions. Thus, in various preferred embodiments of the present invention, the solid shape elements to be arranged on the substrate are not always such triangular pyramidal convex portions but may have any other solid shape. In any case, however, those solid shape elements are preferably arranged such that their vertices are located on the honeycomb lattice points.

Figure 6D:
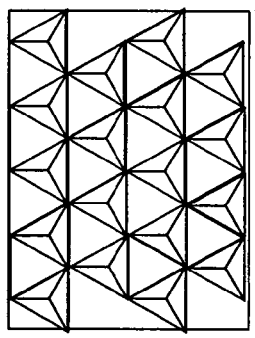

Subsequently, the substrate 61, on which the triangular pyramidal convex portions 63 have defined a predetermined pattern as a result of the anisotropic etching process described above, is subjected to ultrasonic cleaning using an organic solvent such as acetone, thereby removing the remaining unnecessary resist pattern 62 from the substrate 61 as shown in FIGS. 6D and 7D.

Thereafter, an anisotropic crystal growth process is carried out on the solid shape elements on the substrate by using a vapor deposition system. The vapor deposition system may be any of various known systems for use to deposit a thin film by an epitaxial growth process such as a vapor phase epitaxy (VPE) process, a molecular beam epitaxy (MBE) process, or a metal-organic vapor phase epitaxy (MOVPE) process. Into the vapor deposition system, gases of trimethylgallium ($Ga(CH_3)_3$) and arsine ($AsH_3$) are introduced. The crystal growth process can be carried out just as intended by supplying these gases for 100 minutes into an atmosphere at a reduced pressure of 10 Torr while heating the substrate to 630° C.

It should be noted that the active species used to trigger the crystal growth is typically supplied as a gas that includes an element (i.e., gallium or arsenic in this preferred embodiment) contained in the crystalline material of the substrate. In this manner, as in the trimethylgallium and arsine gases described above, the gas including the active species is typically a gas of a molecule that includes an element contained in the crystalline material of the substrate (i.e., at least one of gallium, a gallium compound, arsenic and an arsenic compound in this preferred embodiment). This is because in that case, crystals can be grown appropriately so as to achieve lattice matching with the crystalline material of the surface portion of the substrate.

In this crystal growth process, the surface of the substrate is exposed to the gases that include the elements (i.e., gallium and arsenic) contained in the crystalline material (i.e., GaAs) of the substrate. That is to say, active species are supplied onto the substrate. However, since the solid shape elements (i.e., the convex portions 63 in this preferred embodiment) have already been formed on the surface of the substrate, the GaAs crystals hardly grow perpendicularly to the {111}B planes thereof but selectively grow perpendicularly to the {100} planes thereof. In other words, the active species that are contained in the trimethylgallium and arsine gases do not cause any reaction on the bottoms (i.e., the {111}B planes) but do accelerate crystal growth preferentially on the sidewalls (i.e., the {100} planes). In this manner, the crystal growth advances anisotropically such that the growth rate thereof changes with the specific crystallographic plane orientation.

Figure 6E:
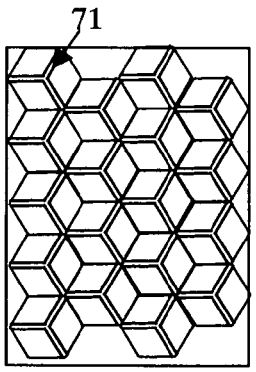

In such a crystal growth process, crystals grow selectively on the predetermined family of crystal planes (i.e., the {100} planes in this preferred embodiment). In this case, the crystal growing zones may be determined by the specific pattern of the solid shape elements that have been defined on the surface of the substrate. Thus, as shown in FIG. 6E, an array of unit elements, consisting mostly of {100} family of crystal planes (which will be sometimes referred to herein as an "initial unit element array"), is defined on the surface of the substrate. In the initial unit element array, non-{100} families of crystal planes are exposed along the edge lines 71 of the respective convex portions.

Figure 10A:
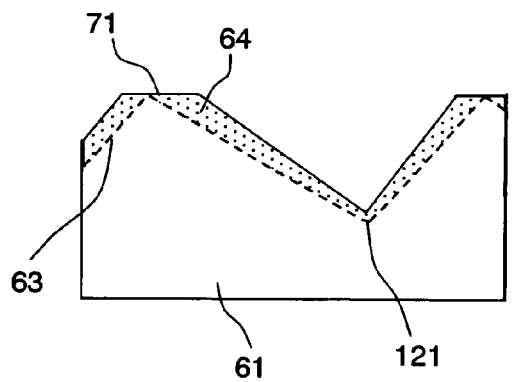
FIGS. 10A through 10D are cross-sectional views illustrating detailed process steps for making a corner cube array according to the first preferred embodiment.

FIG. 7E is a cross-sectional view illustrating a portion of the substrate including the edge lines 71. A more detailed cross section is shown in FIG. 10A. As shown in FIG. 10A, a crystal layer 64 is formed on the convex portions 63 that have been defined by the etching process, and the edge lines 71 (with a width of 2.2 μm, for example) are defined by portions of the surface of the crystal layer 64. Each of these edge lines 71 typically includes triangular {111}B planes, which are created around the vertex of its associated convex portion, and {110} planes, which extend from the vertex and along the edges. These edge lines 71 are created because crystals grow relatively slowly in the <110> direction while the crystal layer 64 is being formed. Also, if the crystal growth process is continued under the same conditions, the edge lines 71 are going to expand.

Figure 6F:
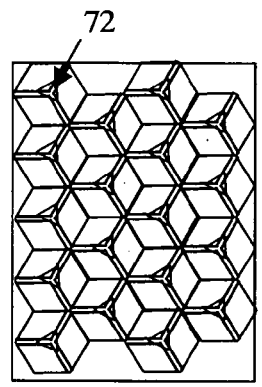

To remove these edge lines 71, a resist pattern 72 is defined as in FIG. 6B so as to cover the vertices of respective convex portions of the crystal layer 64 as shown in FIGS. 6F and 7F. In this process step, the area of each masking element of the resist pattern 72 is preferably smaller than that of its associated masking element of the resist pattern 62 shown in FIG. 6C.

Figure 6G:
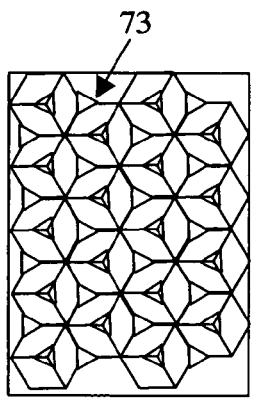
Figure 10B:
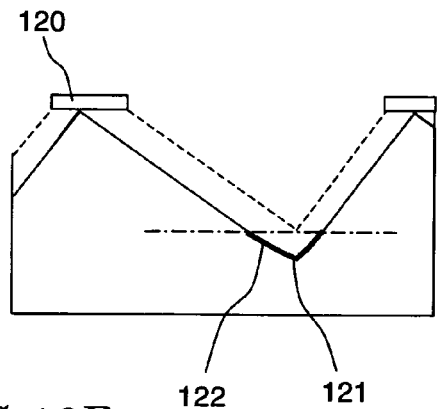

Next, as shown in FIGS. 6G and 7G, an anisotropic wet etching process is carried out. In this preferred embodiment, the wet etching process may be carried out at a temperature of about 20° C. for approximately 20 seconds using the same etchant (i.e., the mixture of $NH_4OH:H_2O_2:H_2O=1:2:7$) as that used in the process step shown in FIG. 6C. That is to say, the wet etching process shown in FIG. 6G is preferably carried out for a shorter time than the wet etching process shown in FIG. 6C. As a result of this wet etching process, the exposed surface of the substrate comes to have a cross-sectional shape such as that shown in FIG. 7G. As shown in FIG. 7G, the edge lines 71 now have a decreased area but triangular non {100} crystal planes (which will be referred to herein as "triangular regions 73") are exposed at the concave portions of the substrate because the etchant also achieves an etch rate ratio R{111}B/R{100} of about 1.7. However, the overall area of these triangular regions 73 is typically smaller than that of the counterparts existing in the concave portions shown in FIG. 6C. A more detailed cross section is shown in FIG. 10B. As shown in FIG. 10B, the bottom 121 of the concave portion of the substrate 61 comes to have an unsharpened portion 122. The unsharpened portion 122 is a region, in which a huge number of steps, having {100} planes as terraces, are formed at an atomic level, and defines slopes around the {100} planes when viewed macroscopically.

Figure 6H:
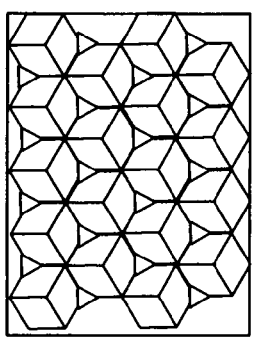

Thereafter, a process step similar to that shown in FIG. 6D is carried out, thereby removing the remaining unnecessary resist pattern 72 from the substrate 61 as shown in FIGS. 6H and 7H. The substrate 61 in this state may be either used as the corner cube array master 203 or subjected to further processes if necessary.

Figure 6I:
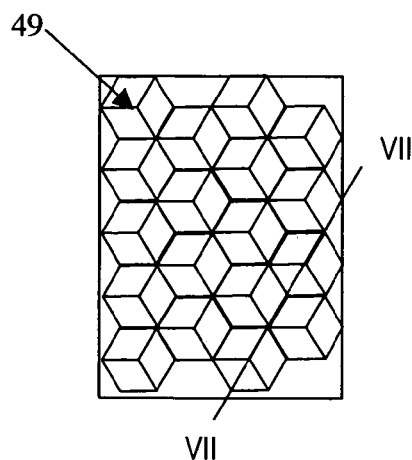
Figure 10C:
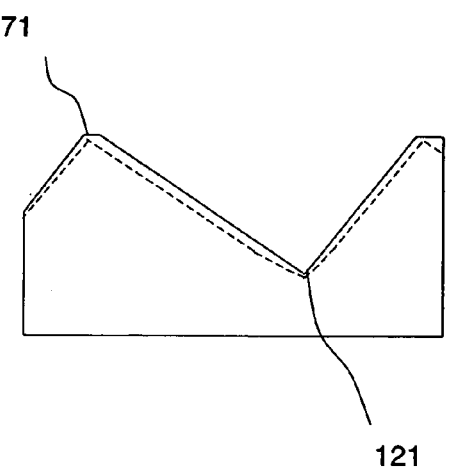
Figure 10D:
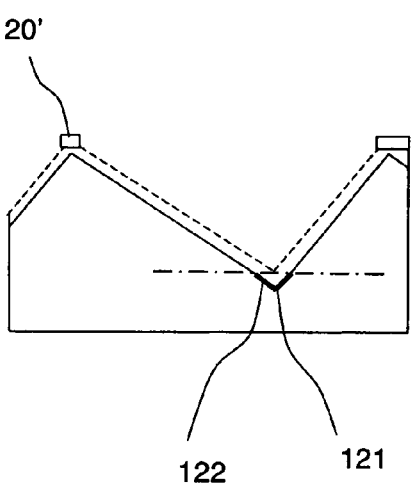

An example of those further processes will be described. First, as shown in FIGS. 6I and 7I, the substrate 61 is subjected to the same crystal growth process again as that shown in FIG. 6E. The crystal growth process can be carried out just as intended by supplying the trimethylgallium ($Ga(CH_3)_3$) gas and arsine ($AsH_3$) gas for about 20 minutes into an atmosphere at a reduced pressure of 10 Torr while heating the substrate to 630° C. That is to say, the crystal growth process shown in FIG. 6I is preferably carried out for a shorter time (i.e., about 20 minutes in this case) than the crystal growth process shown in FIG. 6E. As a result of this crystal growth process, the unwanted crystal planes (i.e., the triangular regions 73) can be eliminated from the concave portions as shown in FIG. 6I and additional edge lines (not shown), having a smaller area than those shown in FIG. 6E, are newly formed on the convex portions. A more detailed cross section is shown in FIG. 10C. As a result of this crystal growth process, the unsharpened portion 122, which existed at the bottom 121 of the concave portion of the substrate 61, can be eliminated, but edge lines 71 (with a width of 1.5 μm, for example) are newly formed on the convex portions as shown in FIG. 10C. Nevertheless, the overall area of the edge lines 71 shown in FIG. 10C is smaller than that of the edge lines 71 shown in FIG. 10A. Thereafter, when a wet etching process is carried out again using a resist pattern 120', in which each masking element has a smaller area than the counterpart shown in FIG. 10A, an unsharpened portion 122 is also formed at the bottom 121 of each concave portion as shown in FIG. 10D. However, the area of the unsharpened portion 122 shown in FIG. 10D is much smaller than that of the unsharpened portion 122 shown in FIG. 10B. The crystal growth and etching processes may be repeatedly performed until the percentage of the unwanted crystal planes, defining the edge lines 71 and unsharpened portion 122, enters a permissible range. As a result of such an additional process, a corner cube array master 203 can be obtained so as to have a more satisfactory shape.

However, the resultant corner cube array master 203 inevitably has unwanted crystal planes. The shapes and locations of those unwanted crystal planes change depending on which of the two types of repetitive patterning processes (i.e., etching and crystal growth processes) is performed last. More specifically, if the process of making the corner cube array master 203 finishes with the etching process, then the percentage of unwanted planes (i.e., triangular regions) at the bottom portions is greater than that of unwanted planes at the peak portions. That is to say, as shown in FIG. 5A, an excessive portion 26 is created at a bottom portion of the resultant corner cube array master 203.

On the other hand, if the process of making the corner cube array master 203 finishes with the crystal growth process, then the percentage of unwanted planes (i.e., edge line portions) at the peak portions is greater than that of unwanted planes at the bottom portions. In that case, as shown in FIG. 5B, a peak portion of the resultant corner cube array master 203 has a missing portion 27.

Figure 11A:
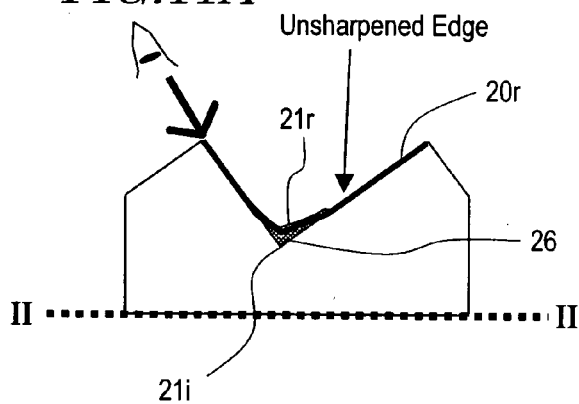
FIG. 11A is a cross-sectional view of a corner cube array master.

The reflective surfaces of the corner cube array master 203 of this preferred embodiment have a shape such as that shown in FIG. 11A, which is a cross-sectional view as viewed on the plane II—II shown in FIG. 1A. As shown in FIG. 11A, there is an excessive portion 26 at the bottom portion 23, the surface of which is unsharpened. Accordingly, the level of the bottom point 21r is higher than that of the ideal bottom point 21i. On the other hand, the peak portion 24 has a relatively good shape.

Figure 11B:
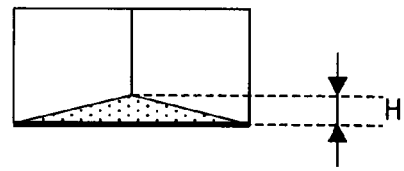
FIG. 11B is a plan view illustrating a bottom portion of the corner cube array master shown in FIG. 11A as viewed along one of the planes that make up the bottom portion.

If the bottom portion 23 is viewed along one of the planes making up that bottom portion. 23 as shown in FIG. 11A, then the excessive portion 26 is recognized as a substantially triangular "strip" as shown in FIG. 11B. By measuring the height H of the vertex of this "strip", the ratio (%) of that height H to the arrangement pitch p (e.g., 10 μm in this preferred embodiment) is obtained. The degree of deformation (i.e., the percentage of unwanted planes) at the bottom portion 23 is supposed to be rated by the magnitude of this H/p ratio. The corner cube array master 203 of this preferred embodiment has an H/p ratio of about 2.0%.

Next, by transferring this corner cube array master 203, a corner cube reflector 202 is obtained. A transfer method will be described with reference to FIGS. 12A through 12C. In this case, the corner cube array master 203 having the excessive portion at the bottom portion as shown in FIG. 5A, which has been obtained by the method described above, is used.

Figure 12A:
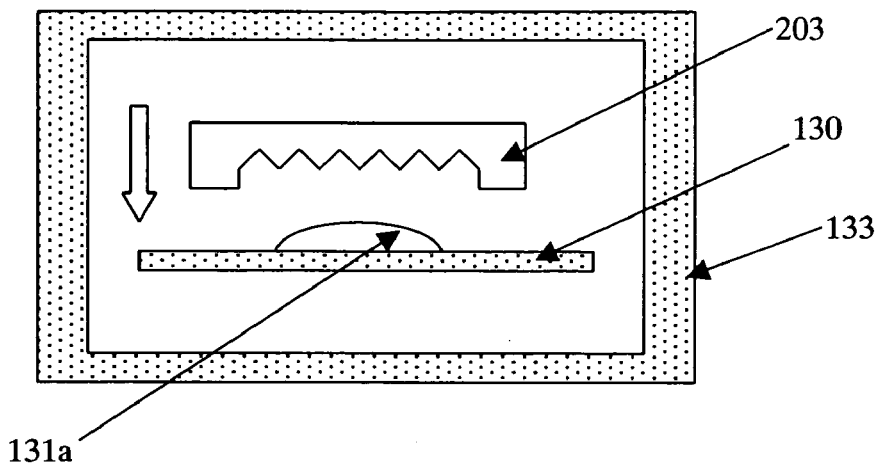
FIGS. 12A through 12C show a transfer process step in the method of making a corner cube array according to the first preferred embodiment.

As shown in FIG. 12A, after an acrylic resin 131a (e.g., MP-107 produced by Mitsubishi Rayon Co., Ltd.) has been dripped as a transfer resin for a 2P (photo polymer) method onto a glass substrate 130 (e.g., Corning glass 1737), the corner cube array master 203 is attached thereto at a reduced pressure within a chamber 133. In this manner, the gap between the substrate 130 and the corner cube array master 203 can be filled with the acrylic resin 131a without introducing bubbles thereto. Examples of preferred transfer resins include not only the acrylic resins but also two-part resins and thermoplastic resins for use in injection molding processes.

Figure 12B:
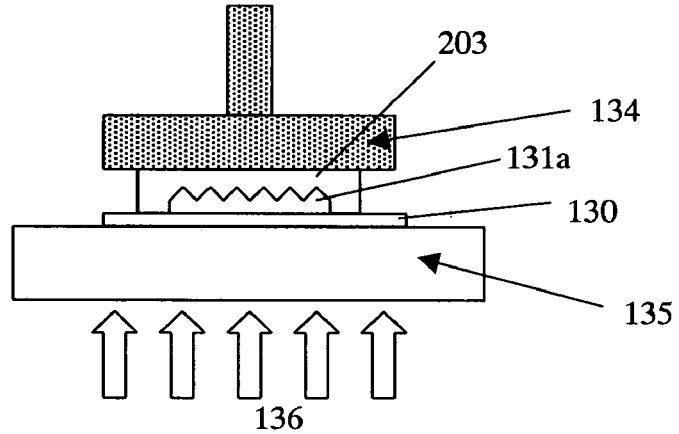

Thereafter, the acrylic resin 131a is cured. Specifically, as shown in FIG. 12B, the substrate 130 is fixed on a quartz plate 135, for example, and then subjected to a pressure of about 1 kg/cm$^2$ by a press machine 134 while the acrylic resin 131a is exposed to ultraviolet rays 136 that are emitted from a high-pressure mercury lamp with an intensity of 3 J/cm$^2$. The curing method and condition may change according to the type of the transfer resin. To cure the transfer resin, the resin may be heated or a curing accelerating agent may be added thereto.

Figure 12C:
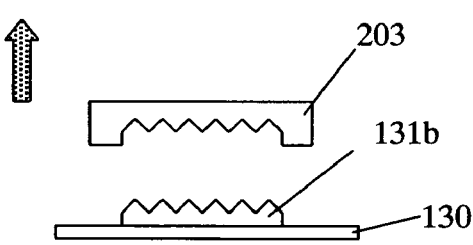

Subsequently, the corner cube array master 203 is released from the substrate 130, thereby obtaining a resin layer 131b with a square corner cube array shape on the substrate 130 as shown in FIG. 12C. The surface shape of this resin layer 131b is the inversion of that of the corner cube array master 203. That is to say, the peak portions of the convex portions of the resin layer 131b are rounded microscopically.

Then, a master substrate (not shown) is made from this resin layer 131b. As used herein, the "master substrate" refers to a mold for obtaining a corner cube reflector 202 as a final product by a transfer technique. The master substrate may be formed by a known technique. For example, a master substrate of nickel (Ni) or any other suitable material may be formed by a combination of an electroforming method and a plating method. Since the electroforming method is one of the transfer methods, the shape of the resultant master substrate becomes approximately the same as that of the corner cube array master 203.

Finally, the shape of the master substrate is transferred to a resin material, for example, by a known transfer technique, thereby obtaining the corner cube reflector 202 as shown in FIG. 5B or 5C. The base plate of the corner cube reflector 202 may be either a film member of PET, for example, or a substrate including TFTs thereon. The surface shape of the corner cube reflector 202 becomes the inversion of that of the corner cube array master 203. Accordingly, the peak portion 24 has a missing portion but the bottom portion 23 has a shape closer to that of the ideal bottom portion 23i.

If necessary, a reflective layer 50 of Ag, for example, may be deposited on the corner cube reflector 202 obtained in this manner.

In order to form a corner cube reflector 202 with a desired shape by the method described above, the point is to control the number of times of transfers to make after the corner cube array master 203 has been prepared and before the corner cube reflector 202 is obtained as a final product.

For example, if the corner cube array master 203 having the shape shown in FIG. 3A is used as described above, a corner cube reflector 202, of which the surface shape is the inversion of the shape shown in FIG. 3A, is obtained by making transfers an odd number of times. On the other hand, if the corner cube array master 203' having the shape shown in FIG. 3B is used, a corner cube reflector 202 may be obtained by making transfers of the master 203' an even number of times. Alternatively, the master 203' may be used as it is as the corner cube reflector 202.

In the preferred embodiment described above, the substrate 61 is made of GaAs single crystals. Alternatively, the substrate 61 may also be made of single crystals of any other compound having a sphalerite structure, e.g., InP, InAs, ZnS or GaP. As another alternative, a substrate made of single crystals having a diamond structure (e.g., germanium crystals) may also be used. An Si substrate may be used, too.

The method of making the corner cube array master 203 is not limited to the above method, either. For example, the photomask 65 may also be arranged on the substrate such that one of the three sides of the equilateral triangular opaque areas 65a is parallel to the <011> directions of the GaAs crystals. Alternatively, a photomask having a different shape from that of the photomask 65 may be used, too. Furthermore, as disclosed in Applied Optics Vol. 35, No. 19, pp. 3466–3470, the initial unit element array may also be defined by forming the solid shape elements on the substrate using an SiO$_2$ pad and then performing a crystal growth process thereon. As another alternative, a known machining technique such as a cutting process may be adopted as well. If the master 203 is obtained by such a method, however, the locations of unwanted planes remaining on the master 203 need to be controllable to a certain degree. In that case, a corner cube reflector 202, which uses either the peak portions or bottom portions of the master 203 as its bottom portions according to the degree of deformation thereof, can be obtained by controlling the number of times of transfers.

The corner cube array master 203 or 203' is preferably obtained by subjecting the surface of the substrate, on which an array of initial unit elements has been defined, to at least two different types of patterning processes. The at least two different types of patterning processes may be any number of patterning processes that satisfy a "complementary relationship". The patterning processes satisfying the "complementary relationship" may refer to a type of patterning process, which can reduce unwanted planes in a surface portion A of the substrate but creates other unwanted planes in another surface portion B of the substrate (e.g., an etching process), and another type of patterning process, which can reduce the unwanted planes in the surface portion B but creates other unwanted planes in the surface portion A (e.g., a crystal growth process). Accordingly, the locations and shapes of the unwanted crystal planes to be created change according to the type of the patterning process that has just been carried out, and are not limited to those described above. By repeatedly performing the at least two different types of patterning processes that satisfy the complementary relationship, the overall percentage of those unwanted planes to the entire substrate surface can be reduced gradually. In addition, it is possible to control the locations of the majority of unwanted crystal planes by determining the type of patterning process to conclude the manufacturing process.

The transfer methods are not limited to the exemplified ones, but may be various other known methods, too. The material of the master substrate is not particularly limited, either. The master 203 of GaAs may be used as the master substrate as it is. Alternatively, by making transfers of the master 203 an even or odd number of times, a master substrate made of a material with excellent mechanical strength (e.g., Ni, which master substrate is called an "Ni stamper") or a master substrate made of a resin material such as a silicone resin may be prepared.

A known transfer material may be used as the material of the corner cube reflector 202. Optionally, the corner cube reflector 202 may be made of a transparent material such as polymethylmethacrylate (PMA). In that case, since the retroreflection (or total reflection) is realized by taking advantage of the difference in refractive index between the transparent material and the air, there is no need to provide any reflective metal layer on the surface.

The present inventors made a sample reflector D1 and evaluated the retroreflection property thereof. The results will be described later.

The sample reflector D1 was obtained in the following manner.

First, a corner cube array master 203 (with an arrangement pitch of 10 μm) was made by the method that has already been described with reference to FIGS. 6A through 7I. In this case, no further patterning process was carried out. Thus, after the anisotropic etching process shown in FIG. 6G was carried out, the resist pattern was stripped from the substrate 61 as shown in FIG. 6H, thereby obtaining a corner cube array master 203 such as that shown in FIG. 10B.

Next, the degree of deformation at the bottom portions of the corner cube array master 203 was estimated. In this example, the H/p ratio was calculated by the method that has been described with reference to FIG. 11. The results are shown in Table 1.

Figure 13A:
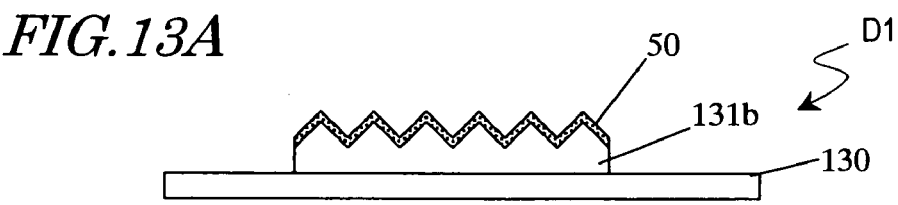
FIGS. 13A and 13B are cross-sectional views of sample reflectors D1 and D2 for use to evaluate the retroreflection property of a corner cube array according to the first preferred embodiment.

Subsequently, the shape of the corner cube array master 203 was transferred onto an acrylic resin by the method shown in FIGS. 12A through 12C, thereby obtaining a resin layer 131b. On the surface of this resin layer 131b with the corner cube array shape, a metal layer 50 of silver (Ag), for example, was deposited to a thickness of 1,500 Å by an evaporation process. In this manner, a sample reflector D1 was obtained by making a transfer of the corner cube array master 203 an odd number of times (i.e., once) as shown in FIG. 13A. The transfer process using a photosensitive resin was carried out just once on the sample reflector D1 for the sake of simplicity. However, even if the transfers are made by any of various other methods an odd number of times, a reflector with substantially the same shape can be obtained.

Figure 13B:
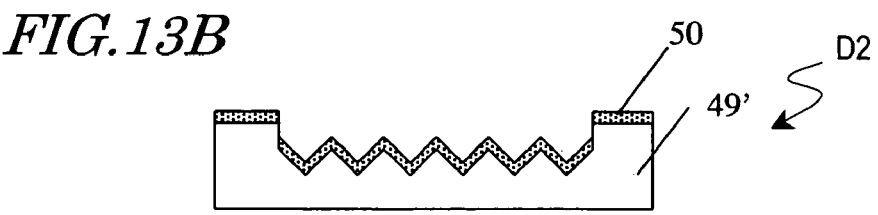

Meanwhile, a sample reflector D2, of which the shape is the inversion of that of the sample reflector D1, was also prepared for the sake of comparison. The sample reflector D2 was obtained by directly depositing a metal layer 50 of Ag, for example, to a thickness of 1,500 Å on the surface of the corner cube array master 203 with the corner cube array shape as shown in FIG. 13B. In this example, the GaAs substrate, i.e., the corner cube array master 203, was used as the sample reflector D2. Alternatively, a reflector having substantially the same shape as the sample reflector D2 can be obtained even by making transfers of the corner cube array master 203 an even number of times.

Figure 4:
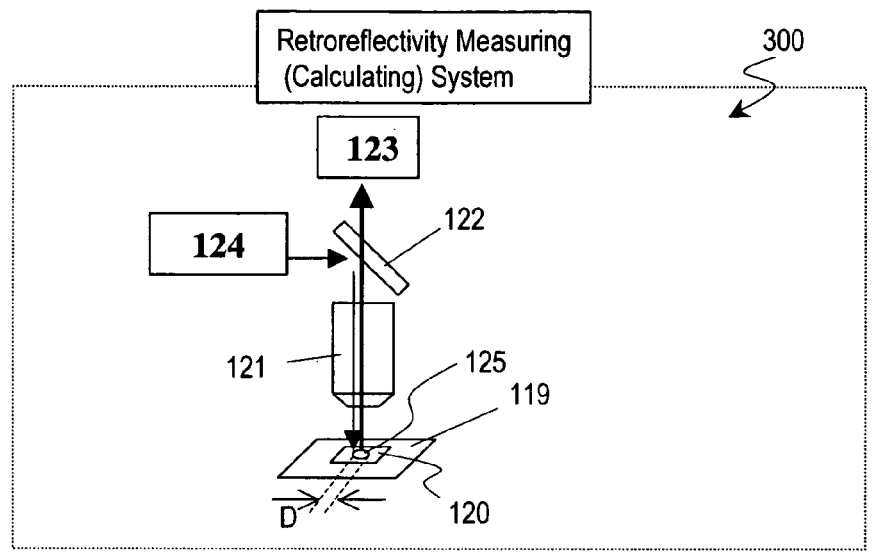
FIG. 4 shows a configuration for a retroreflection property evaluation system according to a preferred embodiment of the present invention.

The retroreflectivities Rr of the sample reflectors D1 and D2 obtained in this manner were measured with the evaluation system 300 shown in FIG. 4. The results are shown in the following Table 1:

TABLE 1

|  | H/p of master | Retroreflectivity Rr |
| --- | --- | --- |
| Sample reflector D1 | 2.0% | 50% |
| Sample reflector D2 | 2.0% | 38% |

As can be seen from the results shown in Table 1, even if corner cube reflectors 202 with similar shape precisions are made from the same corner cube array master 203, the retroreflection property changes significantly according to the number of times of transfers to make in forming the corner cube reflector 202. That is to say, if a corner cube reflector 202, in which the percentage of unwanted planes at the peak (or convex) portions is greater than that of unwanted planes at the bottom (or concave) portions, is formed by controlling the number of times of transfers, the retroreflection property can be improved.

Also, if the two different types of patterning processes are repeatedly performed in making the corner cube array master 203, a master 203 with an even higher shape precision (i.e., having much less excessive portions) can be obtained. In the manufacturing process described above, the last process step is the etching process shown in FIGS. 6G and 6H. However, if the crystal growth and etching processes are further performed repeatedly after that, the shape of the master 203 can be even closer to the ideal one.

Thus, the present inventors modeled a number of corner cube array masters 203 with the two processes repeated different numbers of times (but with each manufacturing process always concluded with the etching process) and analyzed the relationship between the H/p ratio of the corner cube array master 203 and the retroreflection property of the corner cube reflector 202. In this case, the two types of sample reflectors D1 and D2 with mutually opposite shapes were made from each of those corner cube array masters 203 and the retroreflectivities Rr thereof were measured with the evaluation system 300 shown in FIG. 4. The results are shown in FIG. 14.

Figure 14:
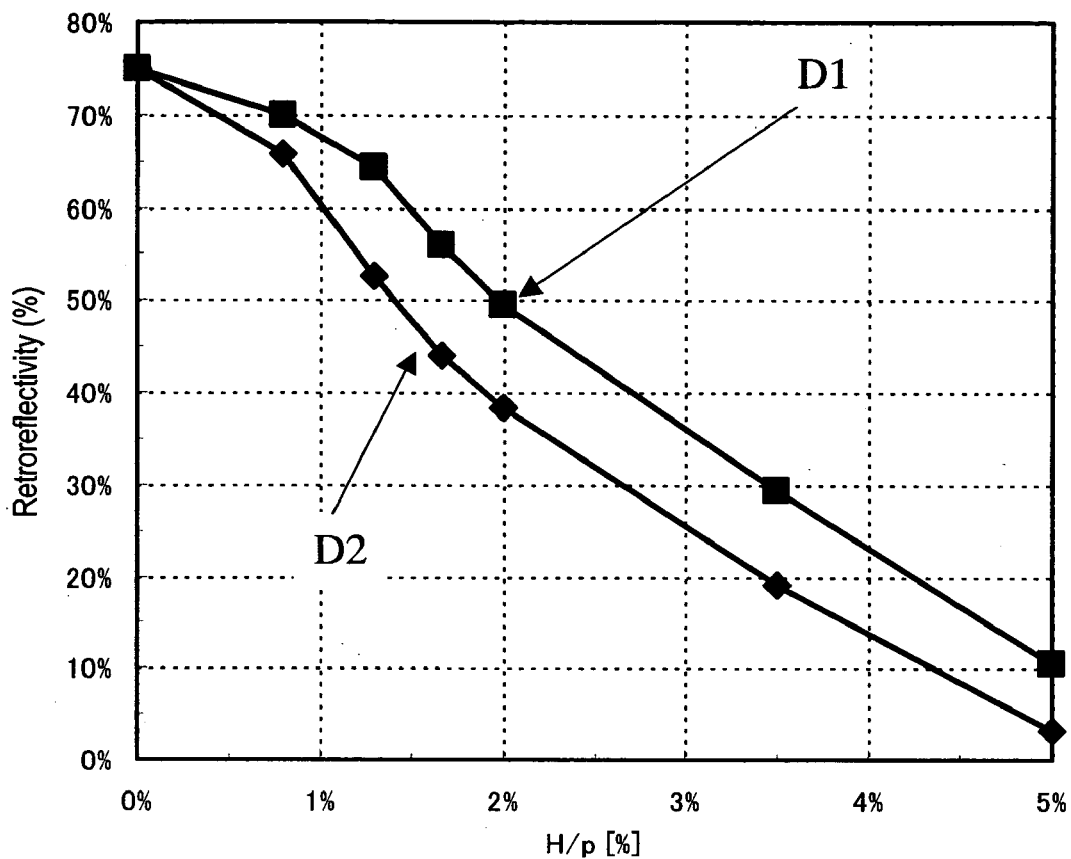
FIG. 14 is a graph showing how the retroreflectivity Rr changes with the H/p ratio.

As can be seen from the results shown in FIG. 14, even if the shape precision is the same, the retroreflectivity Rr can be increased by as much as about 10% by controlling the locations of the unwanted planes. Accordingly, even if a master 203 with a low shape precision (i.e., with a high H/p ratio) is used, a corner cube reflector with high retroreflection property can still be obtained by controlling the number of times of transfers. For example, if a master 203 with an H/p ratio of 2.0% or less (i.e., with an $h_2/p$ ratio of 2.5% or less) is formed by repeatedly performing the two different types of patterning processes, a corner cube reflector 202 with a retroreflectivity Rr of 50% or more can be obtained by adjusting the number of times of transfers to make after that. The $h_1/p$ ratio of the resultant corner cube reflector 202 is 2.5% or less, and the $h_2/p$ ratio thereof is lower than the $h_1/p$ ratio. Also, if a master 203 with an H/p ratio of 1.4% or less (i.e., with an $h_2/p$ ratio of 1.7% or less) is formed, a corner cube reflector 202 with a retroreflectivity Rr of 50% or more can always be obtained no matter how many times the transfers are made. The $h_1/p$ and $h_2/p$ ratios of the resultant corner cube reflector 202 are both 1.7% or less. The sample reflector D2 (with an $h_2/p$ ratio of 1.7%), obtained from the master with an H/p ratio of 1.4%, has a retroreflectivity Rr of about 50%. Thus, the $h_2/p$ ratio of the corner cube reflector is preferably 1.7% or less because the retroreflectivity Rr of 50% or more is achieved with more certainty.

Embodiment 2

Hereinafter, a reflective display device according to a preferred embodiment of the present invention will be described.

Figure 15:
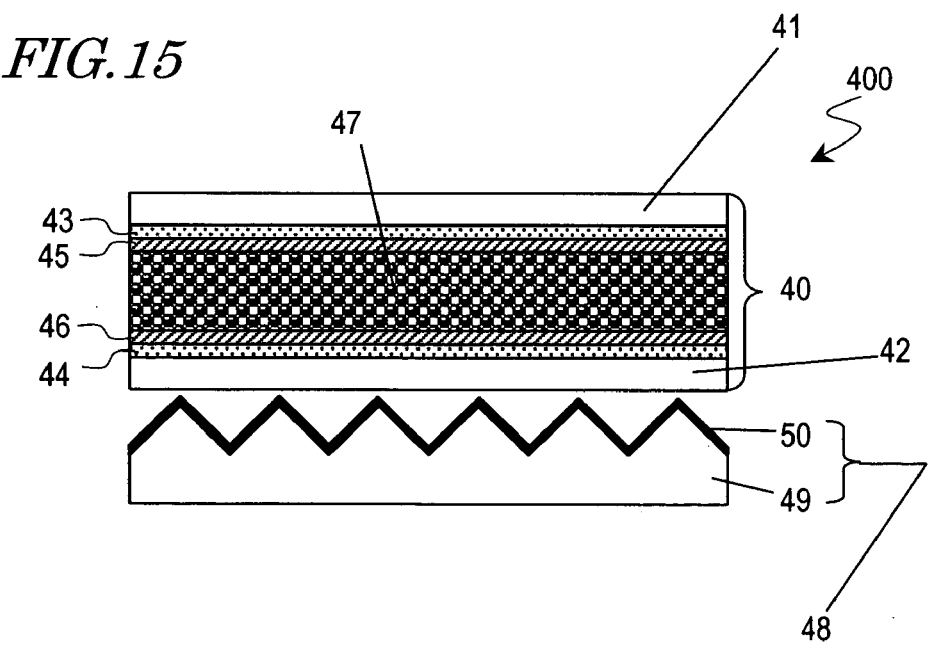
FIG. 15 is a schematic cross-sectional view illustrating a configuration for a reflective display device according to a second specific preferred embodiment of the present invention.

First, the configuration of a reflective display device 400 according to this preferred embodiment will be described with reference to FIG. 15. The reflective display device 400 includes a corner cube reflector (i.e., a retroreflector in this case) 48 and a liquid crystal cell 40, which is provided closer to the viewer than the corner cube reflector 48 is. The corner cube reflector 48 includes a corner cube array 49 and a metal layer 50 deposited on the surface of the corner cube array 49. The corner cube array 49 is formed by the same method, and has the same configuration, as the corner cube array 202 of the first preferred embodiment described above. Accordingly, to the viewer's eyes, the corner cube array 49 consists of a plurality of concave portions with a relatively good shape and a plurality of convex portions with a more incomplete shape than the concave portions. In the corner cube array 40, each convex portion has a rounded shape. The arrangement pitch of the square corner cubes 203 is preferably sufficiently smaller than the pixel pitch of the display device and may be 10 μm, for example. The metal layer 50 is made of a material with high reflectivity. The higher the metallic reflectivity of the metal layer 50, the higher the retroreflectivity Rr of the retroreflector. In this preferred embodiment, the metal layer 50 is preferably made of Ag in view of its actual structure because Ag has a relatively high metallic reflectivity among various metals readily available. The corner cube reflector 48 may have a retroreflectivity Rr of 50%, for example.

The liquid crystal cell 40 includes a pair of transparent substrates 41 and 42 facing each other and a liquid crystal layer 47 interposed between the substrates 41 and 42. The transparent substrates 41 and 42 are made of a transparent material such as glass or a polymer film. On the surface of the transparent substrate 41 provided closer to the viewer, a transparent electrode 43 and an alignment film 45 are stacked in this order so as to face the liquid crystal layer 47. On the surface of the other transparent substrate 42, a transparent electrode 44 and an alignment film 46 are also stacked in this order so as to face the liquid crystal layer 47, too. The liquid crystal layer 47 may be made of any liquid crystal material as long as the layer 47 can switch between two states with mutually different optical characteristics (e.g., a scattering state and a transmitting state). The material of the liquid crystal layer 47 may be a high-molecular weight or low-molecular weight scattering liquid crystal material.

In this preferred embodiment, a polymer-dispersed liquid crystal material is used as the material of the liquid crystal layer 47. The liquid crystal layer 47 may be formed by preparing a mixture of a low-molecular-weight liquid crystal composition and an unpolymerized prepolymer in a miscible state, injecting the mixture into the gap between the substrates 41 and 42 and then polymerizing the unpolymerized prepolymer. The polymerization may be carried out either by irradiating the prepolymer-liquid crystal mixture with an active ray such as an ultraviolet ray or by heating the prepolymer-liquid crystal mixture. However, if the polymerization is produced by heating, another member on the substrate may be affected by the heat. For that reason, the mixture is preferably polymerized through the exposure to an ultraviolet ray. Accordingly, a UV-curing prepolymer with liquid crystal properties is preferably used as the prepolymer. The prepolymer-liquid crystal mixture may be obtained by adding a small amount of polymerization initiator (produced by Ciba-Geigy Corporation, for example) to a mixture of a UV-curing prepolymer and a low-molecular weight liquid crystal composition that have been mixed at a weight ratio of about 20:80, for example. The prepolymer-liquid crystal mixture obtained in this manner exhibits a nematic liquid crystal phase at room temperature.

The liquid crystal layer 47 is switchable between the scattering state and the transmitting state upon the application of a voltage from the transparent electrodes 43 and 44 to the liquid crystal layer 47. In this preferred embodiment, the liquid crystal layer 47 is designed so as to exhibit the scattering state with no voltage applied thereto but to exhibit the transmitting state upon the application of a predetermined voltage thereto.

Figure 16:
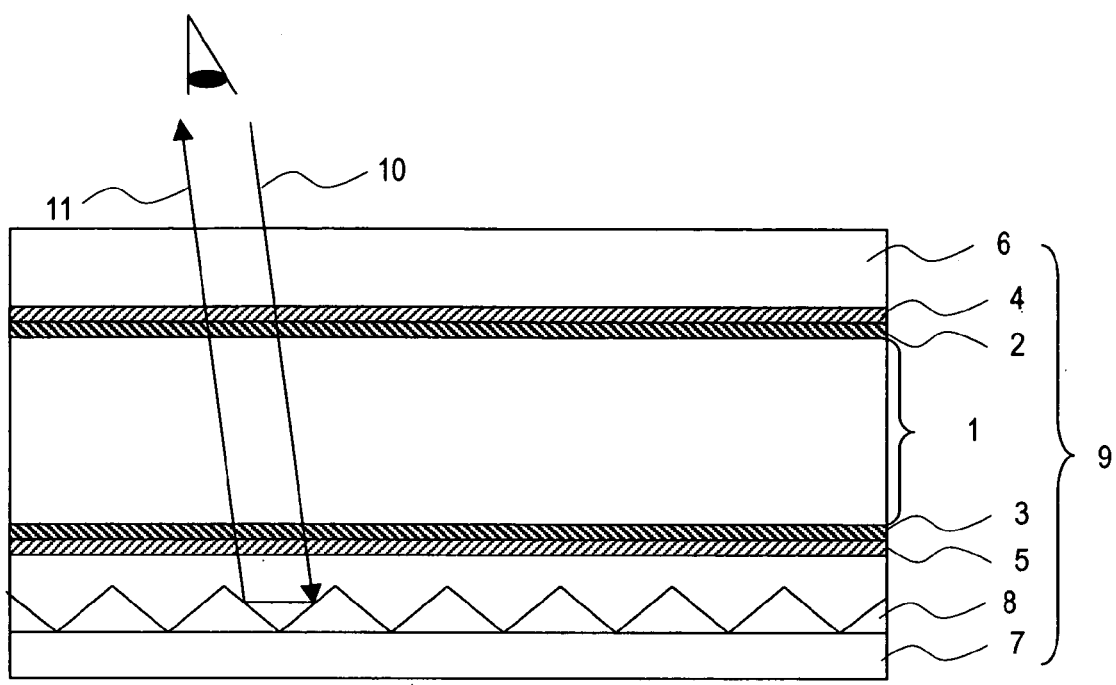
FIG. 16 is a cross-sectional view illustrating a configuration for a conventional reflective display device with a retroreflector.

The reflective display device 400 switches between the white and black display modes just as already described with reference to FIG. 16.

The reflective display device 400 includes the corner cube reflector 48 with a high retroreflectivity Rr of 50%, thus achieving a display with a high contrast ratio. It should be noted that the retroreflectivity Rr of the corner cube reflector 48 is preferably at least equal to 50%. This is because if the retroreflectivity Rr is 50% or more, a sufficiently high contrast ratio (of about 1:3 or more) is achieved.

In the reflective display device 400, the corner cube reflector 48 is provided outside of the liquid crystal cell 40 and there is a gap between them. Optionally, a transparent layer having approximately the same refractive index as the transparent substrate 42 may be provided in this gap. Alternatively, the corner cube array 49 may be made of a transparent material and the corner cube reflector 48 may be arranged such that the corner cube array 49 contacts with the transparent substrate 42 of the liquid crystal cell 40. In that case, the square corner cube array 49 may also function as the transparent substrate 42.

Also, in the reflective display device 400, the retroreflector 48 is arranged such that the surface with the corner cube array faces the viewer. Alternatively, the retroreflector 48 may also be arranged such that the surface with the corner cube array faces the opposite direction. In that case, however, the shape of the retroreflector 48 needs to be adjusted such that the convex portions thereof have a more incomplete shape to the viewer's eyes after the retroreflector 48 has been fixed. Optionally, the metal layer 50 may be omitted and the retroreflector 48 may utilize the internal total reflection of the corner cube array 49 then.

Various preferred embodiments of the present invention described above provide a corner cube reflector that has a very small arrangement pitch and exhibits a high retroreflection property. In addition, such a corner cube reflector can be made easily according to the present invention.

The present invention further provides a reflective display device that includes such a corner cube reflector and achieves excellent display performance.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Application No. 2003-366157 filed in Japan on Oct. 27, 2003, the entire contents of which are hereby incorporated by reference.

What is claimed is:

1. A method of making a master substrate, the method comprising the steps of:

preparing a corner cube array master that has a surface defining a two-dimensional arrangement of unit elements, wherein the unit elements are arranged at a pitch of 200 μm or less, each said unit element has a peak point and a bottom point as viewed in a direction from which incoming light is coming, and a peak portion, including the peak point, and/or a bottom portion, including the bottom point, have an excessive portion and/or a missing portion as compared with an ideal peak portion or an ideal bottom portion of an ideal corner cube array;

making a first transfer by transferring the surface of the corner cube array master; and obtaining a $k^{th}$ transfer as the master substrate by sequentially making an $(n+1)^{th}$ transfer from an $n^{th}$ transfer with n incremented one by one from 1 to k−1, where k and n are both integers, $n \geq 1$, and $k \geq 2$, wherein in the corner cube array master, k is an odd number if an average level difference $h_1$ between the level of the peak point and that of an ideal peak point of the ideal corner cube is greater than an average level difference $h_2$ between the level of the bottom point and that of the ideal bottom point of the ideal corner cube, but k is an even number if the average level difference $h_1$ is smaller than the average level difference $h_2$.

2. A method of making corner cube reflectors, wherein the corner cube reflectors are made using a master substrate formed by the method of claim 1.

3. A master substrate made by the method of claim 1.

4. A method of making a corner cube reflector, the method comprising the steps of:

preparing a corner cube array master that has a surface defining a two-dimensional arrangement of unit elements, wherein the unit elements are arranged at a pitch of 200 μm or less, each said unit element has a peak point and a bottom point as viewed in a direction from which incoming light is coming, and a peak portion, including the peak point, and/or a bottom portion, including the bottom point, have an excessive portion and/or a missing portion as compared with an ideal peak portion or an ideal bottom portion of an ideal corner cube array;

making a first transfer by transferring the surface of the corner cube array master;

obtaining a $k^{th}$ transfer by sequentially making an $(n+1)^{th}$ transfer from an $n^{th}$ transfer with n incremented one by one from 1 to k−1, where k and n are both integers, $n \geq 1$, and $k \geq 2$, wherein in the corner cube array master, k is an odd number if an average level difference $h^1$ between the level of the peak point and that of an ideal peak point of the ideal corner cube is greater than an average level difference $h_2$ between the level of the bottom point and that of the ideal bottom point of the ideal corner cube, but k is an even number if the average level difference $h_1$ is smaller than the average level difference $h_2$; and obtaining the corner cube reflector by using the $k^{th}$ transfer as a master substrate.

5. The method of claim 4, wherein at least a surface portion of the corner cube array master is made of a cubic crystalline material, and wherein the unit elements of the corner cube array master are obtained by patterning the surface portion.

6. The method of claim 5 wherein the crystalline material includes gallium arsenide.

7. The method of claim 5, wherein the unit elements of the corner cube array master are square corner cubes including surfaces that are defined by {100} families of planes of the crystalline material.

8. The method of claim 5, wherein the step of preparing the corner cube array master includes the steps of:

defining solid shape unit elements on a substrate including the crystalline material; and growing crystals by feeding a first active species, including an element contained in the crystalline material, onto the substrate.

9. A corner cube reflector made by the method of claim 4.

10. A method of making a corner cube reflector, the method comprising the steps of:

preparing a corner cube array master that has a surface defining a two-dimensional arrangement of unit elements, wherein the unit elements are arranged at a pitch of 200 μm or less, each said unit element has a peak point and a bottom point as viewed in a direction from which incoming light is coming, a bottom portion, including the bottom point, has an excessive portion and/or a missing portion as compared with an ideal bottom portion of an ideal corner cube, the level of the bottom point is higher than that of the ideal bottom point of the ideal corner cube, and an average level difference $h_1$ between the level of the peak point and that of an ideal peak point of the ideal corner cube is smaller than an average level difference $h_2$ between the level of the bottom point and that of the ideal bottom point;

making a first transfer by transferring the surface of the corner cube array master;

obtaining a $k^{th}$ transfer by sequentially making an $(n+1)^{th}$ transfer from an $n^{th}$ transfer with n incremented one by one from 1 to k−1, where k and n are both integers, k is an even number, $n \geq 1$, and $k \geq 2$, at least one of the $n^{th}$ transfers (where n=1 though k−1) being made of a resin material; and obtaining the corner cube reflector by using the $k^{th}$ transfer as a master substrate.

* * * * *